(12) United States Patent
Sakurai

(10) Patent No.: US 7,275,851 B2
(45) Date of Patent: Oct. 2, 2007

(54) RADIATING MEMBER, ILLUMINATING DEVICE, ELECTRO-OPTICAL DEVICE, AND ELECTRONIC DEVICE

(75) Inventor: Shinji Sakurai, Matsumoto (JP)

(73) Assignee: Seiko Epson Corporation (JP)

( * ) Notice: Subject to any disclaimer, the term of this patent is extended or adjusted under 35 U.S.C. 154(b) by 100 days.

(21) Appl. No.: 10/407,157

(22) Filed: Apr. 3, 2003

(65) Prior Publication Data

US 2004/0004424 A1 Jan. 8, 2004

(30) Foreign Application Priority Data

Apr. 4, 2002 (JP) .............................. 2002-102951
Jul. 9, 2002 (JP) .............................. 2002-200412

(51) Int. Cl.
*F21V 7/04* (2006.01)
(52) U.S. Cl. ....................... 362/612; 362/294; 362/581
(58) Field of Classification Search .................. 362/31, 362/294, 580, 555, 558, 264, 345, 561, 581, 362/612
See application file for complete search history.

(56) References Cited

U.S. PATENT DOCUMENTS

| | | | | |
|---|---|---|---|---|
| 5,146,354 | A | * | 9/1992 | Plesinger ..................... 349/59 |
| 5,494,753 | A | * | 2/1996 | Anthony ..................... 428/408 |
| 6,134,092 | A | * | 10/2000 | Pelka et al. ..................... 361/31 |
| 6,517,278 | B2 | * | 2/2003 | Moulinet ................. 403/359.5 |
| 6,595,674 | B1 | * | 7/2003 | Yoneda ....................... 362/555 |
| 6,614,103 | B1 | * | 9/2003 | Durocher et al. ........... 257/678 |
| 6,639,360 | B2 | * | 10/2003 | Roberts et al. ............. 313/512 |
| 6,799,860 | B2 | * | 10/2004 | Nakaoka et al. ............... 362/31 |
| 2002/0089840 | A1 | * | 7/2002 | Kawakami et al. ........... 362/31 |

FOREIGN PATENT DOCUMENTS

| | | |
|---|---|---|
| JP | 58-80622 | 5/1983 |
| JP | 5-47921 | 6/1993 |
| JP | 08-179321 | 7/1996 |
| JP | 08-193766 | 7/1996 |
| JP | 10-199320 | 7/1998 |
| JP | 11-014986 | 1/1999 |
| JP | 11-052373 | 2/1999 |
| JP | 2001-006619 | 1/2001 |
| JP | 2001-160312 | 6/2001 |
| JP | 2001-222902 | 8/2001 |
| JP | 2001-282119 | 10/2001 |
| TW | 522533 | 3/2003 |

OTHER PUBLICATIONS

Communication from Taiwan Patent Office regarding counterpart application.

* cited by examiner

Primary Examiner—John Anthony Ward
(74) Attorney, Agent, or Firm—Harness, Dickey & Pierce, P.L.C.

(57) ABSTRACT

A radiating member, an illuminating device, an electro-optical device, and an electronic device are provided which are capable of absorbing the heat generated from an LED, thereby increasing the amount of electric current flowable through the LED. More particularly, there are provided a point light source, a light guide plate for receiving the light radiated from the point light source, and a radiating plate including an adhesive layer formed to contact the point light source, and a metal layer formed over the adhesive layer and made of the material having a thermal conductivity ($\lambda$) equal to or greater than 90 W/mK at room temperature.

12 Claims, 29 Drawing Sheets

RADIATING MEMBER, ILLUMINATING DEVICE, ELECTRO-OPTICAL DEVICE, AND ELECTRONIC DEVICE

BACKGROUND OF THE INVENTION

1. Technical Field of the Invention

The present invention relates to an illuminating device and an electro-optical device, wherein a radiating member is disposed corresponding to a point light source.

2. Description of the Related Art

Generally, a liquid crystal device, which is one example of an electro-optical device, mainly includes a liquid crystal panel and a backlight for radiating light onto the liquid crystal panel. The liquid crystal panel is formed such that a liquid crystal layer is interposed between a facing substrate and a TFT array substrate. The backlight, particularly a side light-type backlight, mainly includes a light guide plate, disposed adjacent to the liquid crystal panel and having almost the same size as the liquid crystal panel, and an LED (light-emitting device) disposed at the end of the light guide plate. The light guide plate is used to guide the light from the LED and diffused the light, and the light diffused by the light guide plate is radiated onto the liquid crystal panel as a surface light source.

However, in the above-described liquid crystal device, when electric current flows through the LED, thus causing the LED to emit the light, the temperature in the LED is high. The upper limit of the electric current flowing through the LED is kept low so that the temperature in the LED does not adversely effect reliability. Therefore, there is a limitation in increasing the brightness of the LED by increasing the electric current through the LED.

The present invention has been invented to address the above problem. It is therefore an object of the present invention to provide a radiating member, an illuminating device, an electro-optical device, and an electronic device for absorbing the heat generated from the LED, and increasing the electric current flowing through the LED.

SUMMARY

In order to accomplish the above object, the present invention employs the configuration as follows.

The radiating member of the present invention is a radiating member contacting a point light source, and includes an adhesive layer contacting the point light source and a metal layer formed over the adhesive layer.

According to the above configuration, the radiating member possibly contacts and is fixed to the point light source by the adhesive layer. This will radiate the heat generated from the point light source when emitting light by the metal layer having a high thermal conductivity, thus decreasing the temperature on the point light source. Since more electric current is allowed to flow through the point light source with decreased temperature, it is possible to improve the brightness of the point light source.

The radiating member of the present invention is a radiating member contacting a point light source, and includes an adhesive layer contacting the point light source and a carbon graphite layer formed over the adhesive layer.

According to the above configuration, the radiating member possibly contacts and is fixed to the point light source by the adhesive layer. This will radiate the heat generated from the point light source when emitting light by the carbon graphite layer having a high thermal conductivity, thus decreasing the temperature on the point light source. Since more electric current is allowed to flow through the point light source with decreased temperature, it is possible to improve the brightness of the point light source.

The radiating member of the present invention is a radiating member contacting a point light source, and includes an adhesive layer contacting the point light source and a layer formed over the adhesive layer and made of a material having a thermal conductivity ($\lambda$) equal to or greater than 90 W/mK at room temperature.

According to the above configuration, the radiating member possibly contacts and is fixed to the point light source by the adhesive layer. This will radiate the heat generated from the point light source when emitting light by the layer made of a material having the high thermal conductivity ($\lambda$) equal to or greater than 90 W/mK at room temperature, thus decreasing the temperature on the point light source. Since more electric current is allowed to flow through the point light source with decreased temperature, it is possible to improve the brightness of the point light source.

The radiating member is shaped like a sheet, and the metal layer preferably includes a metal selected from the group including copper and aluminum.

According to the above configuration, since the radiating member is shaped like a sheet, it is easy to manufacture the member. Since the respective thermal conductivity of copper and aluminum is high (the thermal conductivity of copper is 386 W/mK and the thermal conductivity of aluminum is 228 W/mK at room temperature.), the brightness of the point light source can be also improved. Furthermore, copper and aluminum cost less than silver and gold, for example.

The above sheet-shaped radiating member is preferably flexible.

According to the above configuration, since the radiating member has a flexible sheet shape, the radiating member can contact the point light source according to the external shape of the point light source. Even if some clearances between the radiating member and the point light source occur because of the non-uniformity of dimensional tolerances, the radiating member can be deformed to contact the point light source.

The point light source preferably includes a light-emitting diode.

According to the above configuration, since the power consumption of the light-emitting diode is small, the power consumption by the electro-optical device can be reduced.

The illuminating device of the present invention is characterized to include a point light source, a light guide plate receiving the light radiated from the point light source, a substrate having the point light source mounted thereon, and a Peltier element installed on the substrate.

By the above configuration, it is possible to forcibly cool the heat generated from the point light source when emitting light near the Peltier element. This will result in decrease the temperature on the point light source. Therefore, since more electric current is allowed to flow through the point light source with decreased temperature, the brightness of the point light source is improved.

The illuminating device of the present invention is characterized to include a point light source, a light guide plate for guiding the light radiated from the point light source, and a radiating member installed to contact the point light source.

According to the above configuration, the radiating member radiates the heat generated from the point light source when emitting light, thus decreasing the temperature on the point light source. Since more electric current is allowed to flow through the point light source with decreased temperature, it is possible to improve the brightness of the point light source.

Preferably, the point light source has a light emitting part for emitting light, and the radiating member contacts the portion other than the light-emitting part of the point light source.

According to the above configuration, the heat generated from the point light source can be radiated without decreasing the efficiency of the light radiated from the point light source on the light guide plate.

Preferably, the illuminating device of the present invention also includes a substrate having the point light source mounted thereon, and the radiating member is installed to contact a portion other than the portion where the point light source is mounted on the substrate.

According to the above configuration, the heat generated from the point light source can be radiated without complicating the configuration of the mounted components of the point light source.

The point light source has a portion facing the light guide plate, and the radiating member preferably contacts a portion other than the portion of the point light source facing the light guide plate.

According to the above configuration, the heat generated from the point light source can be radiated without decreasing the efficiency of the light radiated from the point light source onto the light guide plate.

The illuminating device also includes a substrate having the point light source mounted thereon, and the point light source is interposed between the substrate and the radiating member. The light guide plate includes a lateral side onto which the light is radiated from the point light source, and a light-emitting side which does not face the lateral side and which emits light. The point light source is preferably installed to face the lateral side.

According to the above configuration, the heat generated from the point light source can be radiated without decreasing the efficiency of the light radiated from the point light source onto the light guide plate.

The radiating plate is preferably installed to contact the point light source and the light guide plate.

According to the above configuration, the radiating member is installed having a size to contact the point light source and the light guide plate, thus increasing the contact width, which allows the heat generated from the point light source to be radiated.

The point light source is installed along the lateral side of the light guide plate with plural pieces, and the radiating member is shaped like a sheet which is flexible. The radiating member is preferably installed to integrally (simultaneously) contact the plurality of the point light sources.

According to the above configuration, since the radiating member has a flexible sheet shape, the radiating member can contact the point light source according to the external shape of the point light source. Even if some clearances between the radiating member and the point light source occur because of the non-uniformity of dimensional tolerances, the radiating member can be deformed to contact the point light source. In addition, since the radiating member is designed to integrally (simultaneously) contact a plurality of the point light sources, it is easy to reduce the number of the elements and to install the radiating member. In addition, since the width of the radiating member can be increased, the capability of radiating the heat can be increased.

The point light source is installed along the lateral side of the light guide plate with plural pieces, and the radiating member is preferably installed with plural pieces to correspond to the plurality of the point light sources respectively.

According to the above configuration, since a plurality of the radiating members are installed on the corresponding point light sources, the stress does not readily transmit through the radiating member to the point light source when the illuminating device is impacted and the radiating member is stressed, thus improving the impact resistance.

A reflecting sheet is also installed on the opposite side of the light-emitting side of the light guide plate, and the radiating member is shaped like a sheet, and preferably, designed to be partially overlapped with the reflecting sheet.

According to the above configuration, the radiating member can be also fixed to the reflecting sheet, and the light radiated from the point light source onto the light guide plate can be prevented from leaking through the radiating member and the reflecting sheet.

Preferably, the reflecting sheet is made to have a radiation function.

According to the above configuration, by installing the reflecting sheet, it is possible to radiate the heat generated from the point light source while reflecting the light from the light guide plate on the liquid crystal panel.

The radiating member preferably covers the point light source two-dimensionally.

According to the above configuration, it is possible to shut off the stray light among the light radiated from the point light source by the radiating member.

The radiating member at least includes a metal layer, and is shaped like a sheet. Preferably, the metal layer also includes a metal selected from the group consisting of copper and aluminum.

According to the above configuration, since the radiating member is shaped like a sheet, it is easy to manufacture the member. Also, since the thermal conductivity of copper and aluminum is high (the thermal conductivity of copper is 386 W/mK and the thermal conductivity of aluminum is 228 W/mK at room temperature.), thus the brightness of the point light source can be improved. Furthermore, copper and aluminum cost less than silver and gold, for example.

The radiating member includes a material having a thermal conductivity ($\lambda$) equal to or greater than 90 W/mK at room temperature.

According to the above configuration, since the radiating member includes a material having a thermal conductivity ($\lambda$) equal to or greater than 90 W/mK at room temperature, it can easily radiate the heat from the point light source. As the material having a thermal conductivity ($\lambda$) equal to or greater than 90 W/mK at room temperature, there are metal materials such as copper and aluminum, or carbon graphite, for example.

The point light source preferably includes a light-emitting diode.

According to the above configuration, since the power consumption of the light-emitting diode is small, the power consumption by the electro-optical device can be reduced.

The electro-optical device of the present invention includes an electro-optical panel and an illuminating device of the above configuration, which is disposed adjacent to the electro-optical panel.

According to the above configuration, the radiating member radiates the heat generated from the point light source when emitting light, thus decreasing the temperature on the point light source. Since more electric current is allowed to flow through the point light source with decreased temperature, it is possible to improve the brightness of the point light source. Therefore, the electro-optical device employing the illuminating device in which the brightness is improved has a higher quality of display.

The electro-optical device of the present invention includes an electro-optical panel and an aforementioned illuminating device disposed adjacent to the electro-optical panel with each other. The light-emitting side of the light guide plate emits light toward the electro-optical panel, and the substrate is disposed between the electro-optical panel and the light guide plate. The radiating member is shaped like a sheet, and is partially and two-dimensionally overlapped with the side opposite to the light-emitting side of the light guide plate.

According to the above configuration, the light radiated from the point light source toward the light guide plate is prevented from leaking through the radiating member and the light guide plate.

The electro-optical device includes an electro-optical panel, and an illuminating device of the above configuration, which is disposed adjacent to the electro-optical panel. It is characterized in that the radiating member is shaped like a sheet, and the point light source is mounted on the radiating member, and the radiating member contacts the electro-optical panel.

According to the above configuration, since the sheet-shaped radiating member directly contacts the point light source, and the electro-optical panel, the heat generated from the point light source is transmitted through the radiating member to the electro-optical panel.

The electro-optical device includes an electro-optical panel, and an illuminating device of the above configuration, which is disposed adjacent to the electro-optical panel. It is characterized in that it also includes a flexible sheet-shaped substrate on which the point light source is mounted, components for driving the electro-optical panel are mounted on the substrate, and the substrate is electrically connected with the electro-optical panel.

According to the above configuration, the substrate having the point light source mounted thereon, and the substrate having mounted components used for driving the electro-optical panel mounted thereon are made in common so that the number of the necessary component can be reduced.

A frame-shaped light-shielding sheet is also placed between the electro-optical panel and the light guide plate. The electro-optical panel has driving regions driven by a supplied potential, and an opening of the light-shielding sheet includes the driving regions. Also, the reflectivity on the light guide plate-side of the light-shielding sheet is preferably higher than that on the electro-optical panel-side of the light-shielding sheet.

According to the above configuration, the light is reflected from the light guide plate-side of the light-shielding sheet to decrease the loss during the light transmission through the light guide plate, and the light from the electro-optical panel is absorbed on the electro-optical panel-side of the light-shielding sheet.

The substrate is preferably disposed to be overlapped with the light-shielding sheet.

According to the above configuration, since no clearance between the substrate and the light-shielding sheet exists, the efficiency of using the light transmitted through the inside of the light guide plate can be increased.

The substrate is preferably disposed not to be overlapped with the light-shielding sheet.

According to the above configuration, since the substrate and the light-shielding sheet are not overlapped with each other, it is possible to reduce the distance between the electro-optical panel and the light guide plate, thus allowing a slimmer electro-optical panel.

The aforementioned electro-optical device is characterized in that the electro-optical panel has a driving region driven by a supplied potential, and the radiating plate has light-shielding properties, and the radiating plate is disposed on a region other than the driving region of the electro-optical panel.

According to the above configuration, the contrast of the driving region of the electro-optical panel is improved by the light-shielding of a region other than the driving region, and the brightness can be also increased because of the installation of the light-shielding radiating plate.

The electronic device of the present invention is characterized by employing the electro-optical device as its display unit.

According to the above configuration, the electronic device can be provided with a bright display unit.

DETAILED DESCRIPTION

Now, preferred embodiments of the present invention will be described with reference to the drawings.

First Embodiment

Configuration of Illuminating Device and Electro-Optical Device

Figure 1:
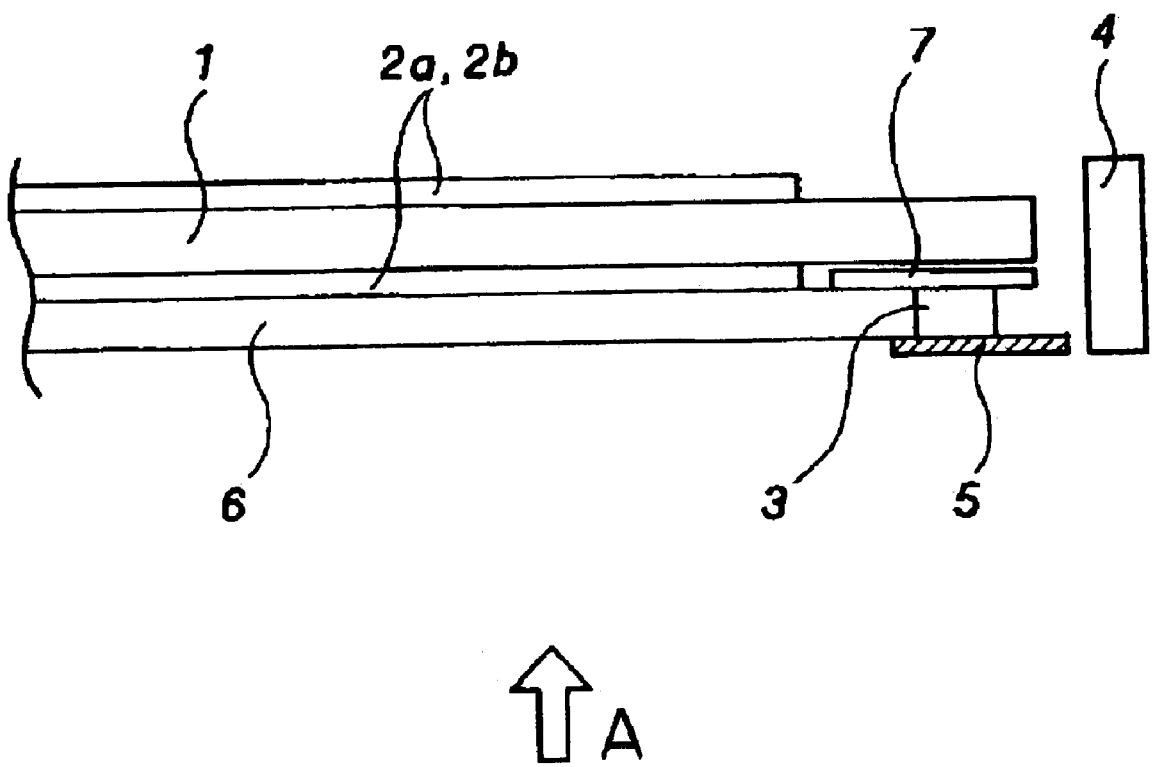
FIG. 1 is a sectional view of an electro-optical device according to a first embodiment of the present invention.
Figure 2:
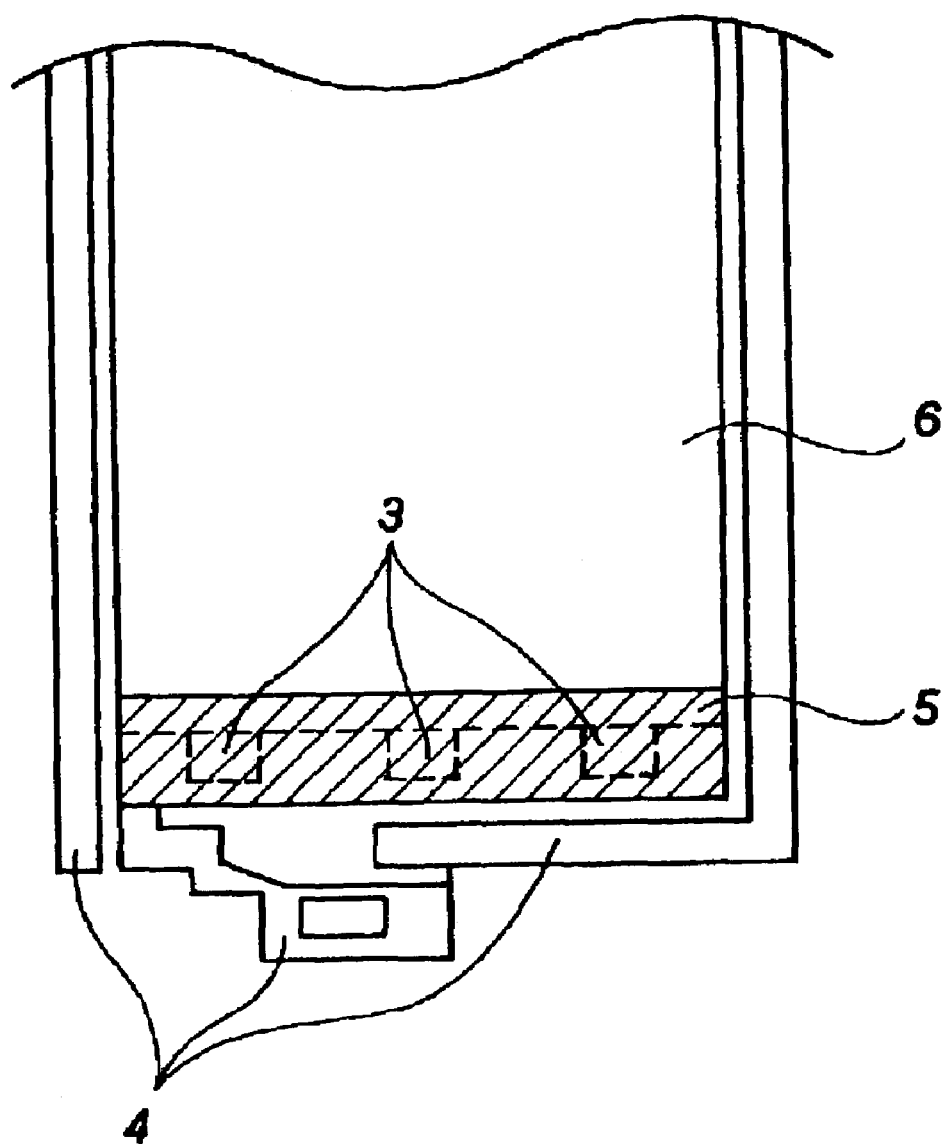
FIG. 2 is a plan view of the electro-optical device according to the first embodiment of the present invention.

Next, the configuration of a liquid crystal device as one example of the electro-optical device of the present invention will be explained referring to FIGS. 1 and 2. FIG. 1 is a sectional view of a liquid crystal device, and FIG. 2 is a plan view of the liquid crystal device of FIG. 1 from the direction of the arrow A.

As shown in FIG. 1, the liquid crystal device (electro-optical device) mainly includes an LCD (liquid crystal panel, an electro-optical panel) 1, and a side light-type illuminating device for radiating light onto the liquid crystal panel 1.

The liquid crystal panel 1 includes a first substrate and a second substrate (not shown), a liquid crystal layer (not shown) interposed between the two substrates, and a pair of polarizing plates 2a, 2b disposed to interpose the two substrates therebetween.

The illuminating device is disposed on the bottom of the liquid crystal panel 1, adjacent to the liquid crystal panel 1. The device mainly includes a light guide plate 6 which is roughly the same size as the liquid crystal panel, and a white colored-LED (light-emitting diode) 3 as a point light source disposed at the end of the light guide plate 6. In this embodiment, three white LEDs 3 are employed. The light guide plate 6 is used to guide the light from the white LED 3 and to diffuse it so as to be a two-dimensional optical source. The light emitted from the light guide plate 6 is radiated on the liquid crystal panel 1. If necessary, the illuminating device further includes an optical member such as a diffused plate, a light focus plate, for example., on the light-emitting side of the light guide plate 6. Or it can further include an optical member such as a reflecting plate, for example. on the side opposite to the light-emitting side of the light guide plate 6. In this case, the diffused plate is disposed on the liquid crystal panel 1 side of the light guide plate 6 so as to diffuse the light from the white LED 3, and it can be used to uniformly irradiate light on the whole surface of the liquid crystal panel 1. In addition, the reflecting plate is disposed on the side opposite to the light-emitting side of the light guide plate 6, and can be used to reflect the light from the white LED 3 so as to effectively use the light.

In this embodiment, the white LED 3 is installed to face the side of the light guide plate 6, and radiates light onto the side of the light guide plate 6. The white LED 3 is mounted on a substrate 7. The substrate 7 can employ either a flexible substrate or a rigid substrate. The substrate 7 having the white LED 3 mounted thereon is interposed between the LCD 1 and the light guide plate 6. A radiating plate 5 is installed to contact a part of the white LED 3, opposite to a part of the white LED 3 mounted on the substrate 7. In other words, the white LED 3 is interposed between the substrate 7 and the radiating plate 5.

In addition, in this embodiment, the LCD 1, the light guide plate 6, the white LED 3, and the substrate 7 are received and fixed inside a case 4 made of plastics, for example.

Next, the radiating plate 5 is explained in detail. The radiating plate 5 has a configuration wherein a metal layer is formed over an adhesive layer. Therefore, the radiating plate 5 of the present invention is bonded on the white LED 3 by the adhesive layer and fixed thereto. In addition, the metal layer used on the radiating layer 5 preferably has a high thermal conductivity, and more particularly, it is preferable to use one having a thermal conductivity equal to or greater than 90 W/mK. In this embodiment, either a copper film or an aluminum film is used since they have high thermal conductivities and cost relatively little. Of course, the invention is not limited to one layer made of one material as the metal layer, and it is possible to use the metal layer formed of the different metal materials. In addition, in this embodiment, the radiating plate 5 is shaped like a flexible sheet.

In addition, as shown in FIGS. 1 and 2, the radiating plate 5 is partially overlapped with the light guide plate 6 two-dimensionally. It is also possible to displace a reflecting sheet on the side of the light guide plate 6 opposite to its light-emitting side so as to partially overlap the light guide plate 5 with the reflecting sheet. In addition, as shown in FIG. 2, the radiating plate 5 is disposed to integrally (simultaneously) cover the three white LEDs 3.

Description of the Effects of the Embodiments of the Present Invention

By the above configuration including the point light source 3, the light guide plate 6 receiving the light radiated from the point light source 3, and the radiating plate 5 installed to contact the point light source 3, the heat generated from the point light source 3 when emitting light is radiated by the radiating plate 5, thus decreasing the temperature on the point light source 3, and making more electric current flow through the point light source 3 with decreased temperature. Therefore, the brightness of the point light source 3 can be improved.

In the conventional configuration without the radiating plate 5 relative to the white LED 3, for example, when 60 mA of electric current flows through the white LED 3, the heat generated on the surface of the white LED 3 was 53 degrees C., and the brightness of the white LED 3 was 1500 cd/m$^2$. On the other hand, in this embodiment wherein the radiating plate 5 was installed to contact the white LED 3, when 74 mA of electric current flows through the white LED 3, the heat generated on the surface of the white LED 3 was 53 degrees C., and the brightness of the white LED 3 was 1800 cd/m$^2$. Therefore, considering the reliability of the white LED 3, when limiting the temperature on the surface of the white LED 3 at 53 degrees C., 14 mA more electric current can be flowed through the white LED 3 compared with the conventional configuration, and the brightness of the white LED 3 can be increased as much as 300 cd/m$^2$.

Modification

The radiating plate 5 in the first embodiment has a configuration wherein a metal layer is formed over an adhesive layer. However, the configuration is not limited to the above. For example, only the metal layer can be directly formed on the white LED just by pressing without providing the adhesive layer. In this case, it is preferable to install a pressing apparatus for pressing the metal layer toward the white LED.

In addition, instead of the metal layer on the radiating plate 5, it is possible to employ, as the radiating member, a material having a thermal conductivity equal to or greater than 90 W/mK at room temperature. As the material, carbon graphite or the like is preferable.

In addition, as shown in FIGS. 1 and 2, the radiating plate 5 is partially installed to cover the white LED 3 corresponding to the location of the white LED 3, however, it is not limited thereto, and therefore, it is possible to extend the radiating plate 5 to the opposite side of the light-emitting side of the light guide plate 6 so as to increase the surface area of the radiating plate 5. By the above configuration, the radiating capability of the radiating plate 5 can be improved. It is also possible to install the radiating plate 5 to extend toward the case 4 as well as toward the side opposite to the light-emitting side of the light guide plate 6. Also in this case, the radiating capability of the radiating plate 5 can be improved. In addition, if the radiating plate 5 is installed to cover most of the side opposite to the light-emitting side of the light guide plate 6, the heat non-uniformity on the overall surface of the liquid crystal device can be prevented, and the temperature of the overall liquid crystal device can be uniformly maintained so as to decrease the displayed non-uniformity on the liquid crystal panel.

In addition, although the radiating plate 5 is installed to directly contact the white LED 3 in this embodiment, it is also possible to install a reflecting sheet on the side opposite to the light-emitting side of the light guide plate, and to extend the reflecting sheet to contact the white LED such that the radiating plate 5 contacts the white LED 3 through the reflecting sheet. By the above configuration, the radiating capability is lower than in the above embodiment, but it is possible to provide a configuration having the radiating capability sustainable for typical use.

Hereinafter, other embodiments are explained and like elements in the first embodiment are referenced to the same numerals.

Second Embodiment

A simple matrix liquid crystal device employing a COG type as one example of an electro-optical device of the present invention will be explained referring to FIGS. 3 and 4.

Figure 3:
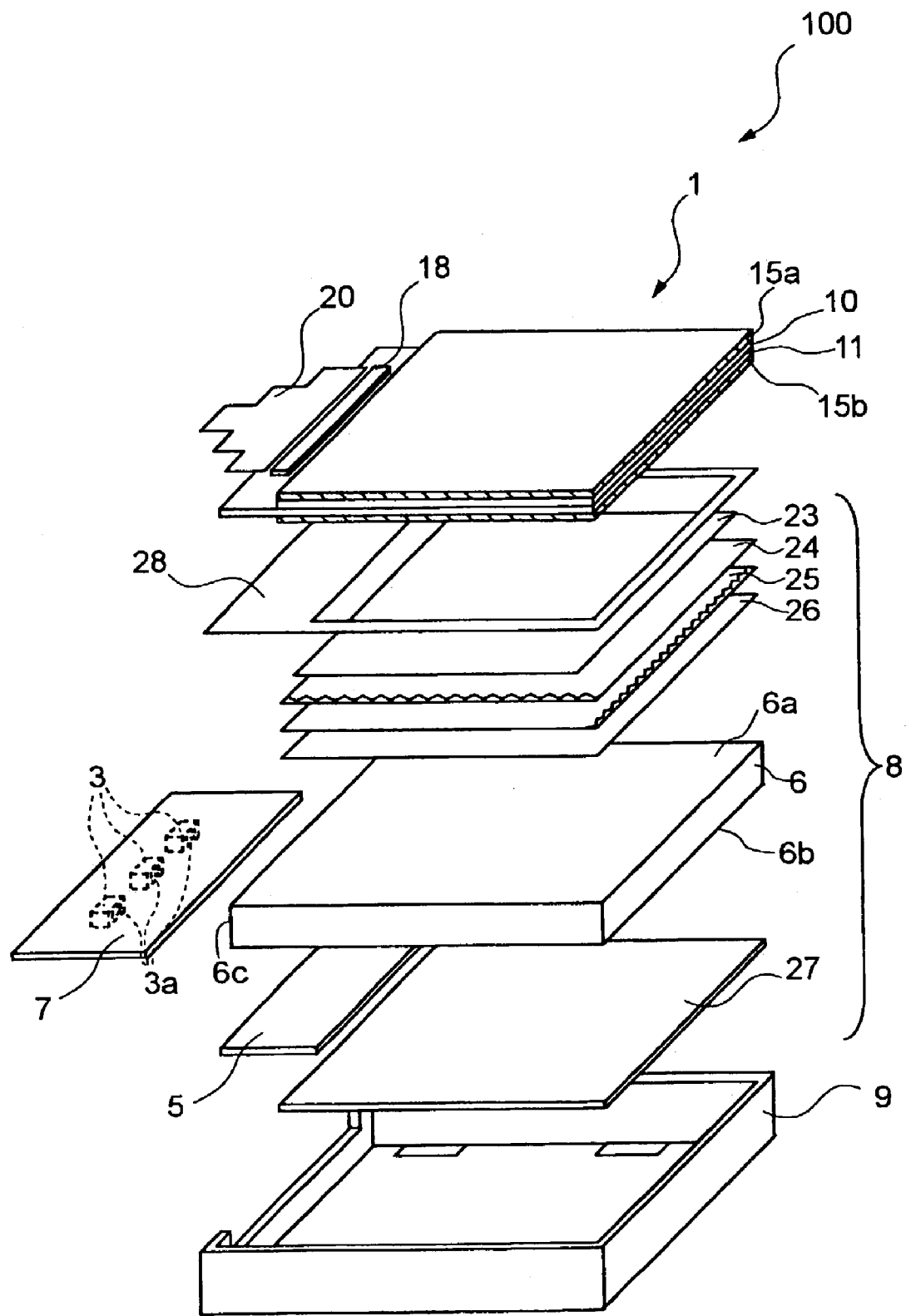
FIG. 3 is an exploded perspective view of a liquid crystal device according to the second embodiment of the present invention.
Figure 4:
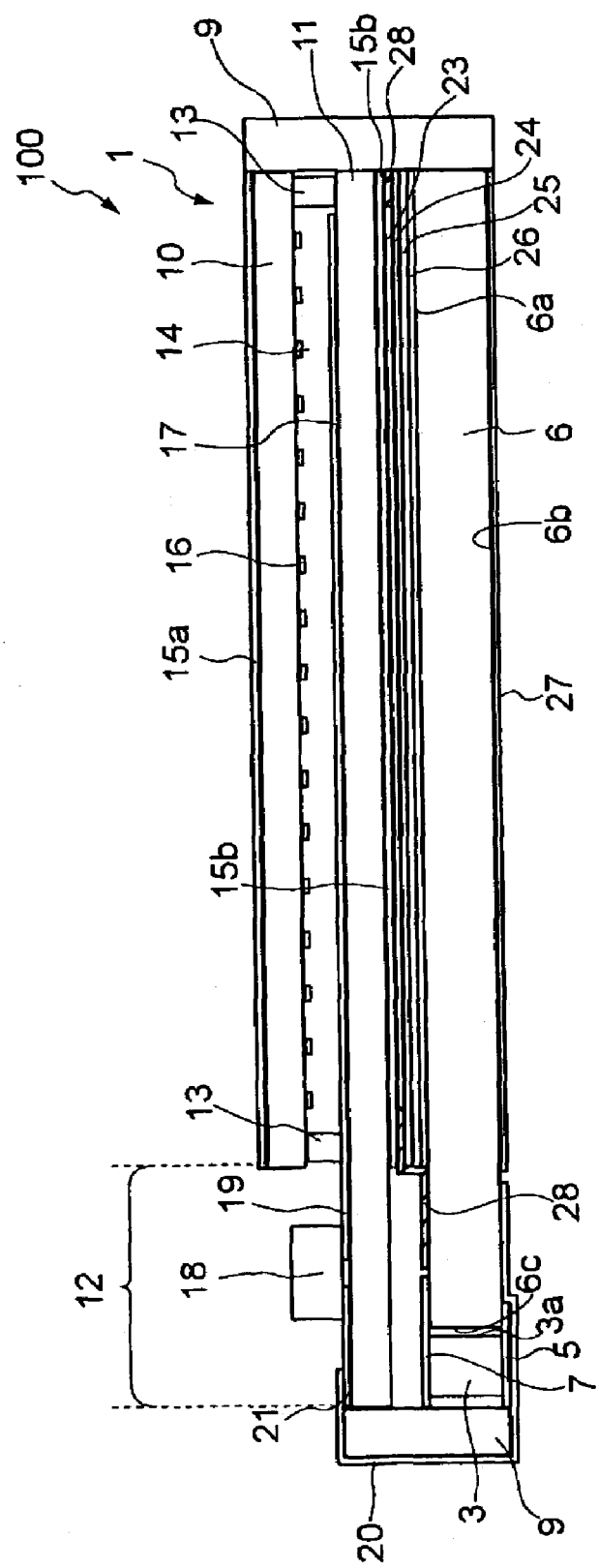
FIG. 4 is a schematic sectional view of the liquid crystal device according to the second embodiment of the present invention.

FIG. 3 is an exploded perspective view of the liquid crystal device according to the second embodiment of the present invention, and FIG. 4 is a schematic sectional view of the liquid crystal device in FIG. 3.

As shown in FIGS. 3 and 4, the liquid crystal device 100 includes a liquid crystal panel 1, an illuminating device 8, a frame-shaped adhesive sheet 28 for bonding the liquid crystal panel 1 and the illuminating device 8, and a case 9 for receiving the above elements.

The liquid crystal panel 1 includes a first substrate 10, a second substrate 11 having a protruded portion 12 extended from the first substrate 10, a seal material 13 installed on the edge portions of the substrates for bonding the first substrate 10 and the second substrate 11, a STN liquid crystal 14 disposed in the space formed by the first substrate 10, the second substrate 11, and the seal material 13 as electro-optical material, and a first polarizing plate 15a and a second polarizing plate 15b installed to interpose the pair of the substrates therebetween.

On the surface of the first substrate 10 facing the second substrate 11, there are formed a first transparent electrode 16, which is shaped like a stripe, and includes a plurality of ITO (Indium Tin Oxide) films, and an alignment layer (not shown) made of polyimide, for example. to cover the first transparent electrode 16. On the other hand, on the surface of the second substrate 11 facing the first substrate 10, there are formed a second transparent electrode 17, which is shaped like a stripe and includes a plurality of ITO (Indium Tin Oxide) films to cross the first transparent electrode 16, and an alignment layer (not shown) made of polyimide, for example. to cover the second transparent electrode 17. In the liquid crystal device 100, a pixel is formed by the first transparent electrode 16 and the second transparent electrode 17 facing each other, and a liquid crystal 14 interposed therebetween. By selectively changing the voltage applied to each pixel, the optical characteristics of the liquid crystal 14 can be changed, and the light radiated from the illuminating device 8 can be modulated when being transmitted through the liquid crystal 14 corresponding to each pixel. By modulating the light as above, images or the like can be displayed, and driving regions, that is, a display unit in the liquid crystal panel 1 are almost equal to the region surrounded by the seal material 13.

The frame-shaped adhesive sheet 28 has light-shielding properties, and the opening of the adhesive sheet 28 includes driving regions. In addition, the reflectivity on the illuminating device 8 side of the adhesive sheet 28 is higher than that on the liquid crystal panel 1 side of the adhesive sheet 28. By the above, the light is reflected from the light guide plate 6 side of the adhesive sheet 28, thus decreasing the loss of the light transmitted through the light guide plate 6. The light from the liquid crystal panel 1 is absorbed on the liquid crystal panel 1 side of the adhesive sheet 28. In addition, the adhesive sheet 28 is installed so that it does not overlap with the substrate 7 on which the white LED 3 is mounted. Since the substrate 7 and the adhesive sheet 28 do not overlap with each other, it is possible to reduce the distance between the liquid crystal panel 1 and the light guide plate 6, thus allowing the thickness of the liquid crystal device 100 to be reduced.

On the protruded portion 12, there are mounted a driving IC 18, and a circuit 19, formed by extending the second transparent electrode 17, for electrically connecting the driving IC 18 to the second transparent electrode 17, and a terminal unit 21 for electrically connecting a circuit board 20 by the driving IC 18 and an ACF (anisotropic conductive film).

The illuminating device 8 is disposed adjacent to the second transparent substrate 11 of the liquid crystal panel 1, and the second substrate 11 side of the liquid crystal panel 1 is the light-receiving side from the illuminating device 8, and the first substrate 10 side of the liquid crystal panel 1 is the light-emitting side of the light which is radiated from the illuminating device 8, passes through the inside of the liquid crystal panel 1, and is emitted from the liquid crystal panel 1.

Next, the configuration of the illuminating device is explained.

The illuminating device 8 includes a substantially rectangular-shaped light guide plate 6 with a first side 6a of the light-emitting side toward the second substrate 11 of the liquid crystal panel 1, a plurality of white LEDs 3 (three white LEDs 3 in this embodiment) as an optical source along the lateral side 6c of the light guide plate 6, a diffused plate 23, a prism sheet 24, a prism sheet 25, and a diffused plate 26 sequentially disposed as rectangular sheet-shaped optical parts between the liquid crystal panel 1 and the light guide plate 6 toward the liquid crystal panel 1 when assembling the liquid crystal device 100, and a rectangular sheet-shaped reflecting sheet 27 as an optical part disposed adjacent to a second side 6b facing the first side 6a as a light-emitting side of the light guide plate 6, and in addition, includes a substrate 7 having the white LED 3 mounted thereon, and a radiating plate 5 disposed as a radiating member facing the substrate 7 through the white LED 3. The radiating plate 5 is disposed in contact with the white LED 3, and disposed in contact with a part of the second side 6b of the light guide plate 6.

The light guide plate 6 is intended to uniformly radiate the light from the white LED 3 onto the inner surface of the liquid crystal panel 1 for the liquid crystal panel 1 disposed corresponding to the light guide plate 6, and is made of acryl resin or polycarbonate, for example. The light emitted from the white LED 3 is radiated toward the lateral side 6c of the light guide plate 6 facing away from the first side 6a. The reflecting sheet 27 is intended to reflect the light from the light guide plate 6 on the liquid crystal panel 1 side. The diffused plates 23 and 26 are intended to make the brightness of the light inside a display screen more uniform. Two prism sheets 24, 25 are intended to adjust the alignment angle of the emitting light, and to improve the brightness of the front side.

Figure 5:
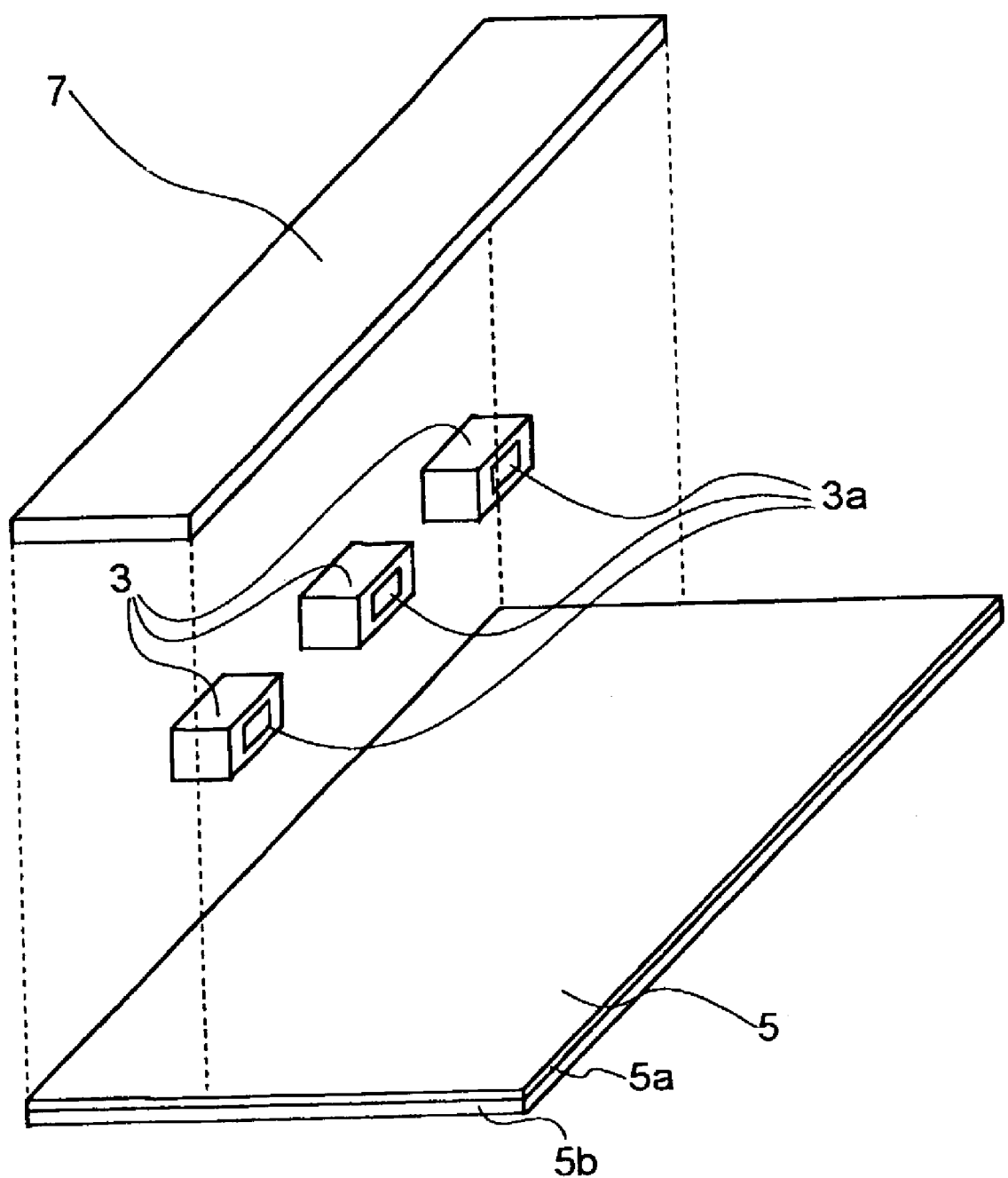
FIG. 5 is an exploded perspective view showing a part of the illuminating device of the liquid crystal device according to the second embodiment of the present invention.
Figure 6:
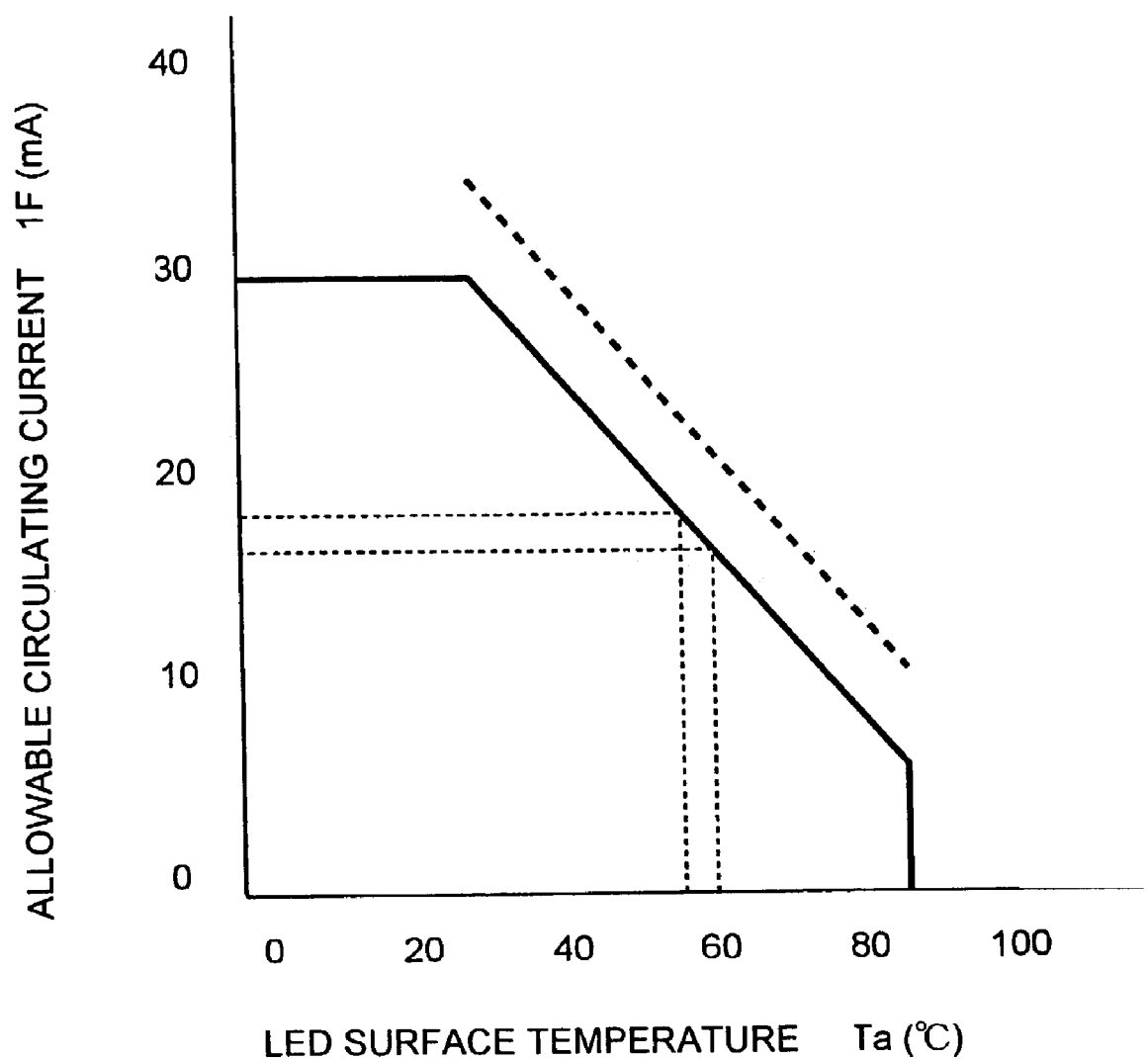
FIG. 6 is a graphical representation showing the relation of the temperature on the surface of the LED and the allowable circulating current in the illuminating device according to the second embodiment of the present invention and in the conventional illuminating device respectively.

FIG. 5 is an exploded perspective view of the white LED and the radiating plate mounted on the substrate, and FIG. 6 is a graphical representation showing the relation of the temperature on the surface of the LED and allowable circulating current flowing through the LED in the illuminating device of the liquid crystal device in the conventional one and according to the embodiment of the present invention respectively, wherein the dotted line shows the conventional liquid crystal device and the solid line shows the liquid crystal device of the embodiment of the present invention.

As shown in FIG. 5, three white LEDs 3 are mounted on the substrate 7. The white LED 3 has a light emitting part 3a facing the light guide plate 6, and the light is emitted from the light emitting part 3a toward the light guide plate 6. The radiating plate 5 has a configuration in which a metal layer 5b is formed over an adhesive layer 5a as in the first embodiment. Therefore, the radiating plate 5 of the present invention is bonded and fixed to the white LED 3 by the adhesive layer 5a. It is preferable that the metal layer 5b as a part of the radiating plate 5 has a high thermal conductivity, and more particularly, it is preferable to use metal having a thermal conductivity equal to or greater than 90 W/mK at room temperature. In the embodiment of the present invention, either a copper film or an aluminum film, which has high thermal conductivities and relatively low cost, is used. Of course, the invention is not limited to one layer made of one material as the metal layer 5b, a metal layer made of different materials can be employed. The thickness of the metal layer 5b, is preferably, 10 μm to 1 mm. In the embodiment of the present invention, a copper film or an aluminum film having the thickness of 38 μm is used. In addition, the radiating plate 5 is flexible sheet-shaped.

As shown in FIGS. 3 to 5, the radiating plate 5 is partially overlapped with the light guide plate 6 two-dimensionally, and the radiating plate 5 is disposed to integrally (simultaneously) cover three white LEDs 3. The radiating plate 5 is installed to contact the portion other than the light emitting part of the white LED 3, in other words, than the portion facing the light guide plate 6 and which is mounted on the substrate 7.

As described above, the heat generated from the white LED 3 is transmitted to the radiating plate 5, and can be radiated since the white LED 3 contacts the radiating plate 5 having a high thermal conductivity.

By the above configuration including the white LED 3, the light guide plate 6 receiving the light from the white LED 3, and the radiating plate 5 installed to contact the white LED 3, the heat generated from the white LED 3 when emitting light is radiated by the radiating plate 5 so as to decrease the temperature on the white LED 3, and more electric current can be flowed through the white LED 3 with decreased temperature, leading to an improvement in brightness of the white LEDs 3. In addition, for example, five white LEDs are conventionally used for the illuminating device, but in the embodiment of the present invention, just three white LEDs are enough for the illuminating device to provide the same value of the brightness by the same amount of the electric current as those in the conventional case so as to decrease the number of the employed components of the LEDs.

For example, in the conventional liquid crystal device in FIG. 6, the temperature on the surface of the white LED 3 was about 55 degrees C. when about 12 mA of electric current flows through the white LED 3. On the other hand, in the embodiment of the present invention, the temperature on the surface of the white LED 3 was about 55 degrees C. when about 18 mA of electric current flows through the white LED 3. Therefore, by considering the reliability of the white LED 3, in the case of regulating the temperature on the surface of the white LED 3, for example, to 55 degrees C., the configuration of the embodiment of the present invention allows more electric current by 6 mA to flow through the white LED 3 compared with the conventional configuration.

Figure 7:
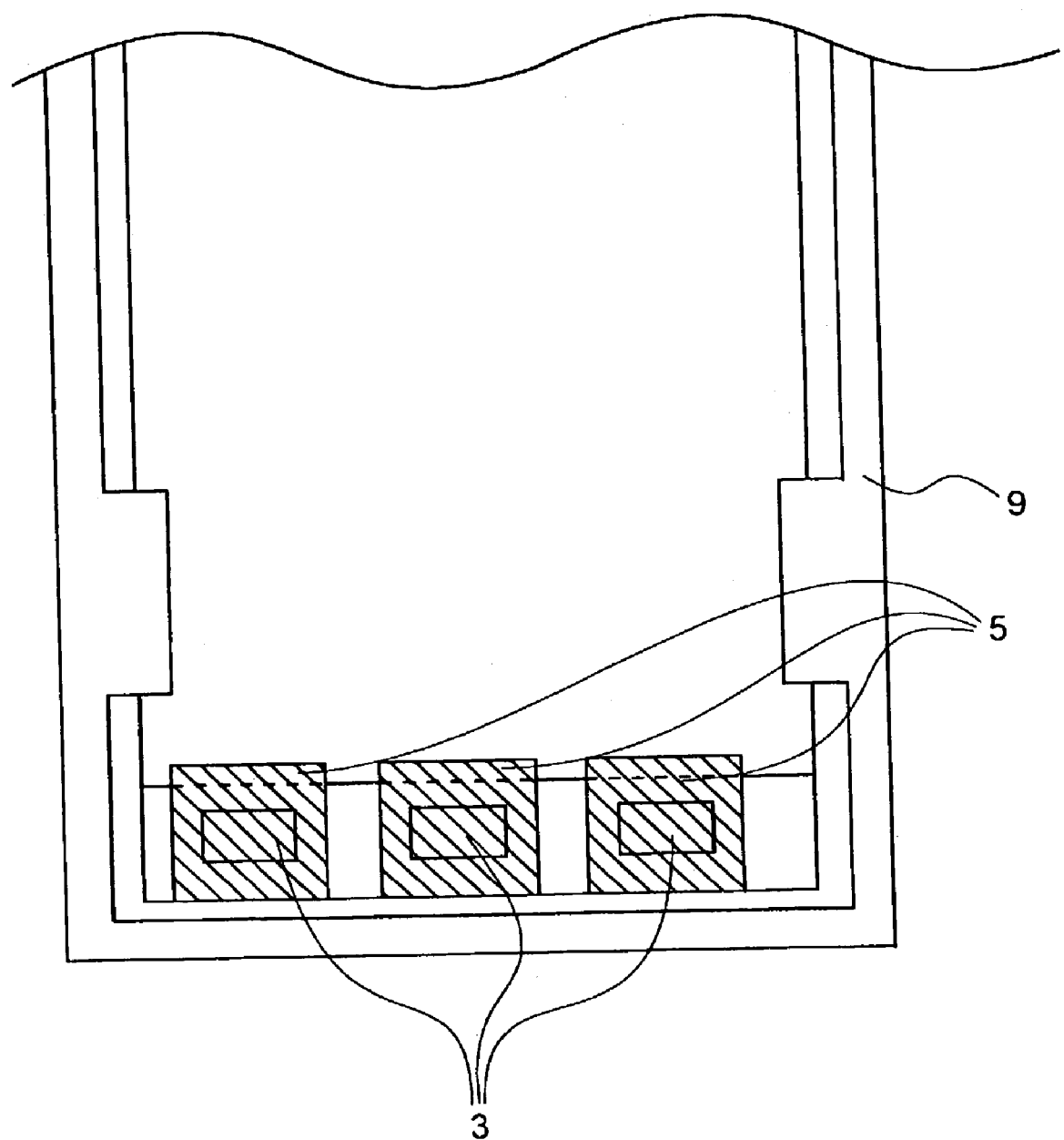
FIG. 7 is a plan view of the liquid crystal device according to the modification of the second embodiment of the present invention.

In addition, in the embodiment of the present invention, the radiating plate 5 integrally (simultaneously) contacts a plurality of the white LEDs 3, but as shown in FIG. 7, a plurality of radiating plates 5 can be installed to correspond to a plurality of the white LEDs 3 respectively. By doing so, the impact resistance can be improved since the stress does not readily transmit through the radiating plate 5 to the white LED 3 when the liquid crystal device 100 is impacted and the radiating plate 5 is stressed. In addition, FIG. 7 is a plan view of the liquid crystal device from the backlight side.

Furthermore, the radiating plate 5 in this embodiment is possible to be partially overlapped with the reflecting sheet 27. By the above configuration, the radiating plate 5 can be fixed to the reflecting sheet 27, and the light radiated from the white LED 3 toward the light guide plate 6 can be prevented from leaking through the radiating plate 5 and the reflecting sheet 27.

Figure 8:
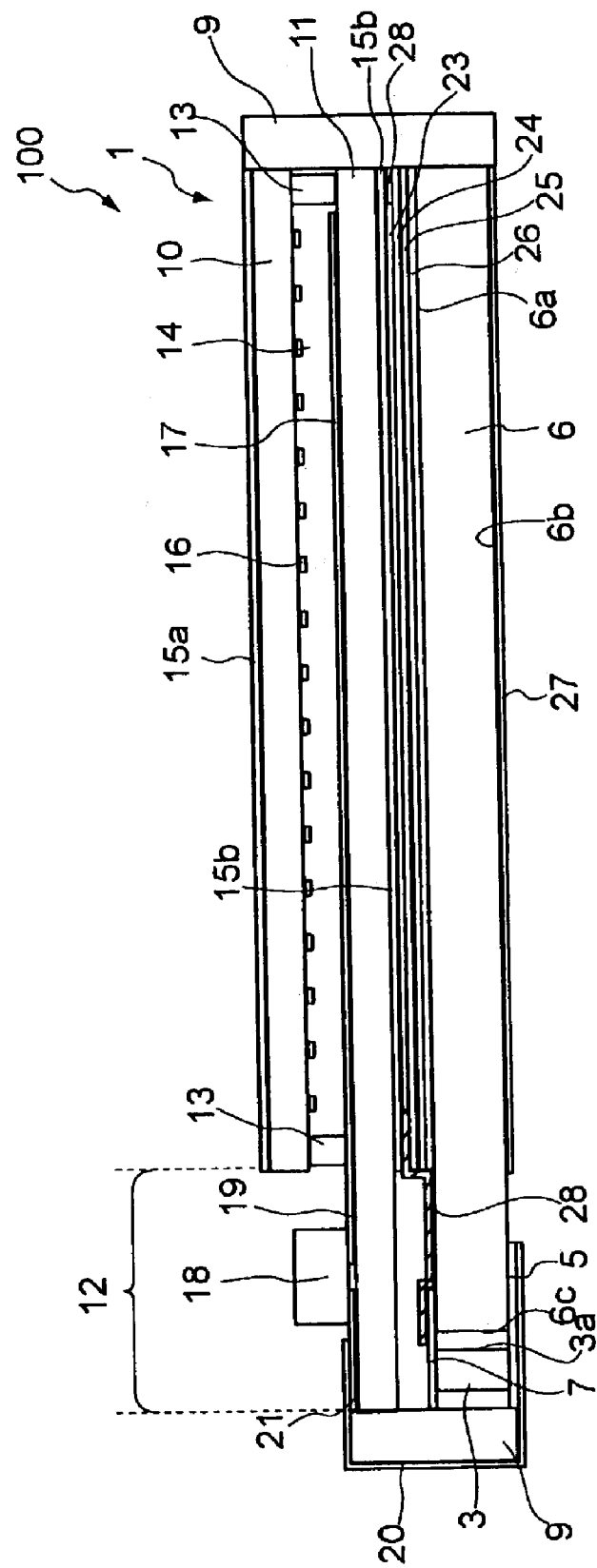
FIG. 8 is a schematic sectional view of the liquid crystal device according to the modification of the second embodiment of the present invention.

In this embodiment, the frame-shaped adhesive sheet 28 having light-shielding properties is installed so that it does not overlap with the substrate 7 on which the white LED 3 is mounted, but as shown in FIG. 8, the adhesive sheet 28 may be overlapped with the substrate 7. Since no clearance between the substrate 7 and the adhesive sheet 28 exists, the efficiency of the available light transmitted through the inside of the light guide plate can be increased.

Third Embodiment

A liquid crystal device according to a third embodiment of the present invention will be explained referring to FIGS. 9 and 10.

Figure 9:
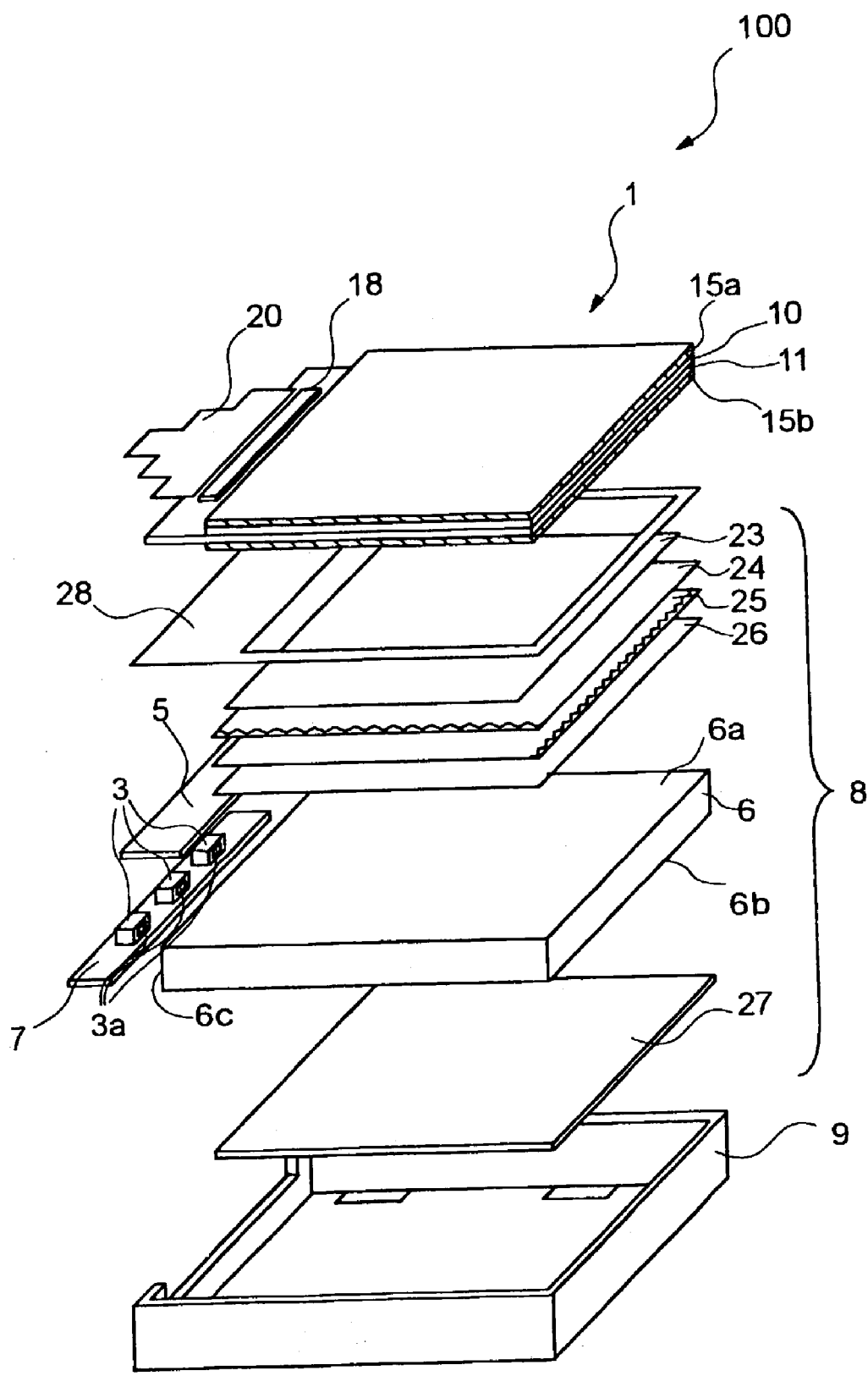
FIG. 9 is an exploded perspective view of the liquid crystal device according to a third embodiment of the present invention.
Figure 10:
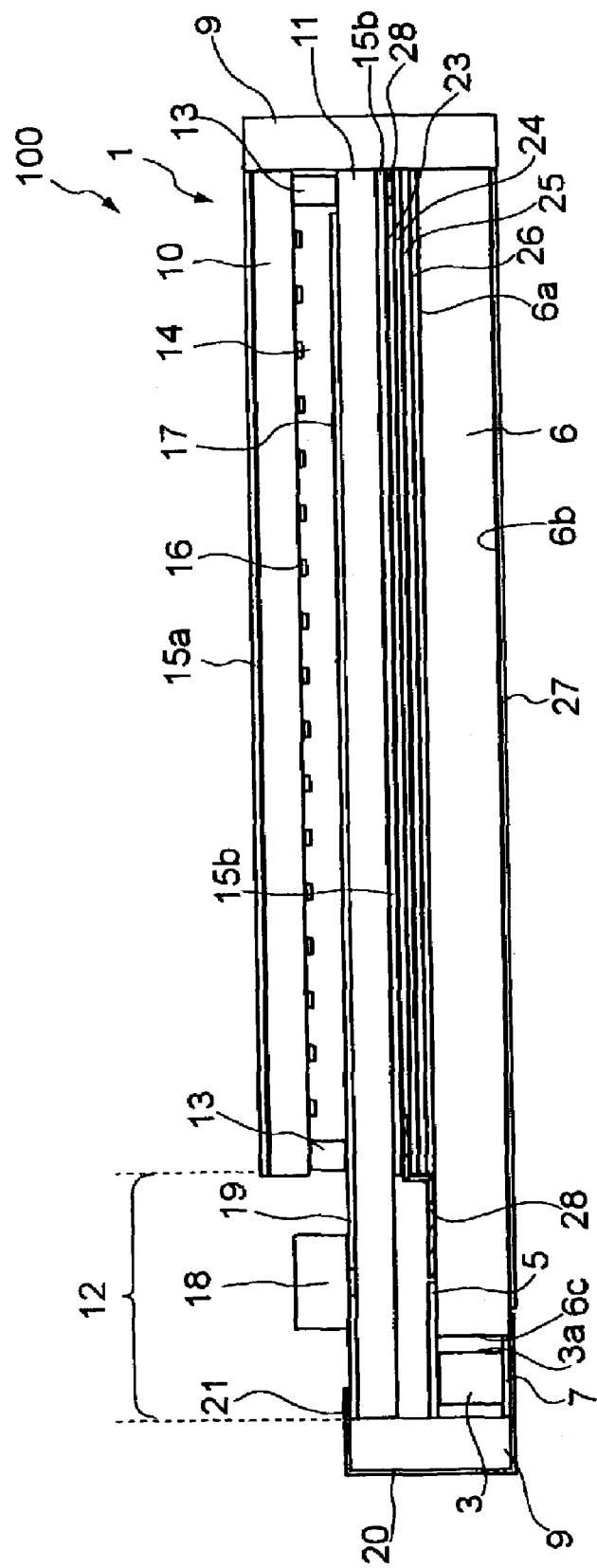
FIG. 10 is a schematic sectional view of the liquid crystal device according to the third embodiment of the present invention.

FIG. 9 is an exploded perspective view of the liquid crystal device according to a third embodiment of the present invention, and FIG. 10 is a schematic sectional view of the liquid crystal device of FIG. 9.

As shown in FIGS. 9 and 10, the liquid crystal device 100 has a different arrangement of the radiating plate 5 and the substrate 7 from the one described in the above embodiment.

As shown in FIGS. 9 and 10, the liquid crystal device 100 includes a liquid crystal panel 1, an illuminating device 8, a frame-shaped adhesive sheet 28 for bonding the liquid crystal panel 1 and the illuminating device 8, and a case 9 for receiving these elements as in the second embodiment.

The liquid crystal panel 1 includes a first substrate 10, a second substrate 11 with a protruded region 12 extended from the first substrate 10, a seal material 13 disposed on the edge portion of the substrates for bonding the first substrate 10 and the second substrate 11, an STN liquid crystal 14 disposed in the space formed by the first substrate 10, the second substrate 11, and the seal material 13 as an electro-optical material, and a first polarizing plate 15a and a second polarizing plate 15b disposed for interposing a pair of the substrates therebetween.

On the surface of the first substrate 10 facing the second substrate 11, there are formed a first transparent electrode 16, which is shaped like a stripe, and includes a plurality of ITO (Indium Tin Oxide) films, and an alignment layer (not shown) made of polyimide, for example. to cover the first transparent electrode 16. On the other hand, on the surface of the second substrate 11 facing the first substrate 10, there are formed a second transparent electrode 17, which is shaped like a stripe and includes a plurality of ITO (Indium Tin Oxide) films to cross the first transparent electrode 16, and an alignment layer (not shown) made of polyimide, for example. to cover the second transparent electrode 17. In the liquid crystal device 100, a pixel is formed by the first transparent electrode 16 and the second transparent electrode 17 facing each other, and a liquid crystal 14 interposed therebetween. By selectively changing the voltage applied to each pixel, the optical characteristics of the liquid crystal 14 can be changed, and the light radiated from the illuminating device 8 can be modulated when being transmitted through the liquid crystal 14 corresponding to each pixel. By modulating the light as above, images or the like can be displayed, and driving regions, that is, a display unit in the liquid crystal panel 1 are almost equal to the region surrounded by the seal material 13.

The frame-shaped adhesive sheet 28 has light-shielding properties, and the opening of the adhesive sheet 28 includes driving regions. Further, the reflectivity on the illuminating device 8 side of the adhesive sheet 28 is higher than that on the liquid crystal panel 1 side of the adhesive sheet 28. By the above configuration, the light is reflected from the light guide plate 6 side of the adhesive sheet 28 so as to decrease the loss of the light transmitted through the light guide plate 6, and the light from the liquid crystal panel 1 side is absorbed on the liquid crystal panel 1 side of the adhesive sheet 28. In addition, the adhesive sheet 28 is installed so that it does not overlap with the radiating plate 5.

On the protruded portion 12, there are mounted a driving IC 18, a circuit 19, formed by extending the second transparent electrode 17, for electrically connecting the driving IC 18 to the second transparent electrode 17, and a terminal unit 21 for electrically connecting a circuit board 20 by the driving IC 18 and an ACF (anisotropic conductive film).

The illuminating device 8 is disposed adjacent to the second transparent substrate 11 of the liquid crystal panel 1, and the second substrate 11 side of the liquid crystal panel 1 is the light-receiving side from the illuminating device 8, and the first substrate 10 side of the liquid crystal panel 1 is the light-emitting side of the light which is radiated from the illuminating device 8, passes through the inside of the liquid crystal panel 1, and is emitted from the liquid crystal panel 1.

Next, the configuration of the illuminating device is explained.

The illuminating device 8 includes a substantially rectangular-shaped light guide plate 6 with a first side 6a of the light-emitting side toward the second substrate 11 of the liquid crystal panel 1, a plurality of white LEDs 3 (three white LEDs 3 in this embodiment) as an optical source along the lateral side 6c of the light guide plate 6, a diffused plate 23, a prism sheet 24, a prism sheet 25, and a diffused plate 26 sequentially disposed as rectangular sheet-shaped optical parts between the liquid crystal panel 1 and the light guide plate 6 toward the liquid crystal panel 1 when assembling the liquid crystal device 100, and a rectangular sheet-shaped reflecting sheet 27 as an optical part disposed adjacent to a second side 6b facing the first side 6a as a light-emitting side of the light guide plate 6, and in addition, includes a substrate 7 having the white LED 3 mounted thereon, and a radiating plate 5 disposed as a radiating member facing the substrate 7 through the white LED 3. The radiating plate 5 is disposed in contact with the white LED 3, and disposed in contact with a part of the first side 6a of the light guide plate 6.

The light guide plate 6 is intended to uniformly radiate the light from the white LED 3 onto the inner surface of the liquid crystal panel 1 for the liquid crystal panel 1 disposed corresponding to the light guide plate 6, and is made of acryl resin or polycarbonate, for example. The light emitted from the white LED 3 is radiated toward the lateral side 6c of the light guide plate 6 facing away from the first side 6a. The reflecting sheet 27 is intended to reflect the light from the light guide plate 6 on the liquid crystal panel 1 side. The diffused plates 23 and 26 are intended to make the brightness of the light inside a display screen more uniform. Two prism sheets 24, 25 are intended to adjust the alignment angle of the emitting light, and to improve the brightness of the front side.

In the illuminating device 8 of the embodiment of the present invention, as shown in FIGS. 9 and 10, the radiating plate 5 is placed on the upper side, and the substrate 7 with the white LED 3 mounted thereon is placed on the lower side. The radiating plate 5 and the substrate 7 are placed facing each other through the white LED 3. In this embodiment, three white LEDs 3 are mounted on the substrate 7. The white LED 3 has a light emitting part 3a, and the white LED 3 is placed along the lateral side 6c such that the light emitting part 3a faces the lateral side 6c of the light guide plate 6. The radiating plate 5 is disposed in contact with the white LED 3, and in contact with a part of the first side 6a of the light guide plate 6. In this embodiment, the radiating plate 5 has a configuration in which a metal layer 5b is formed over an adhesive layer 5a as in the first embodiment. Therefore, the radiating plate 5 of the present invention is bonded and fixed to the white LED 3 by the adhesive layer 5a. It is preferable that the metal layer 5b used in the radiating plate 5 has a high thermal conductivity, and more particularly, it is preferable to use metal having a thermal conductivity equal to or greater than 100 W/mK at room temperature. In the embodiment of the present invention, either a copper film or an aluminum film, which has high thermal conductivities and relatively low cost, is used. Of course, the invention is not limited to one layer made of one material as the metal layer 5b, a metal layer made of different materials can be employed. The thickness of the metal layer 5b, is preferably, 10 µm to 1 mm. In the embodiment of the present invention, a copper film or an aluminum film having the thickness of 38 µm is used. In addition, the radiating plate 5 is flexible sheet-shaped.

The radiating plate 5 is partially overlapped with the light guide plate 6 two-dimensionally, and the radiating plate 5 is disposed to integrally (simultaneously) cover three white LEDs 3. The radiating plate 5 is installed to contact the portion other than the light emitting part of the white LED 3, in other words, than the portion facing the light guide plate 6 and which is mounted on the substrate 7.

As described above, the heat generated from the white LED 3 is transmitted to the radiating plate 5, and can be radiated since the white LED 3 contacts the radiating plate 5 having a high thermal conductivity.

The third embodiment is different from the displacement of the radiating plate 5 and the substrate 7, but as in the second embodiment, the heat generated from the white LED 3 when emitting light is radiated by the radiating plate 5 so as to decrease the temperature on the white LED 3, and more electric current can be flowed through the white LED 3 with decreased temperature, leading to an improvement in brightness of the white Led 3. In addition, for example, five white LEDs are conventionally used for the illuminating device, but in the embodiment of the present invention, just three white LEDs are enough for the illuminating device to provide the same value of the brightness by the same amount of the electric current as those in the conventional case so as to decrease the number of the employed components of the LEDs.

Fourth Embodiment

A simple matrix-typed liquid crystal device employing a COG type as one example of the electro-optical device according to the present invention will be explained referring to FIGS. 11 and 12.

Figure 11:
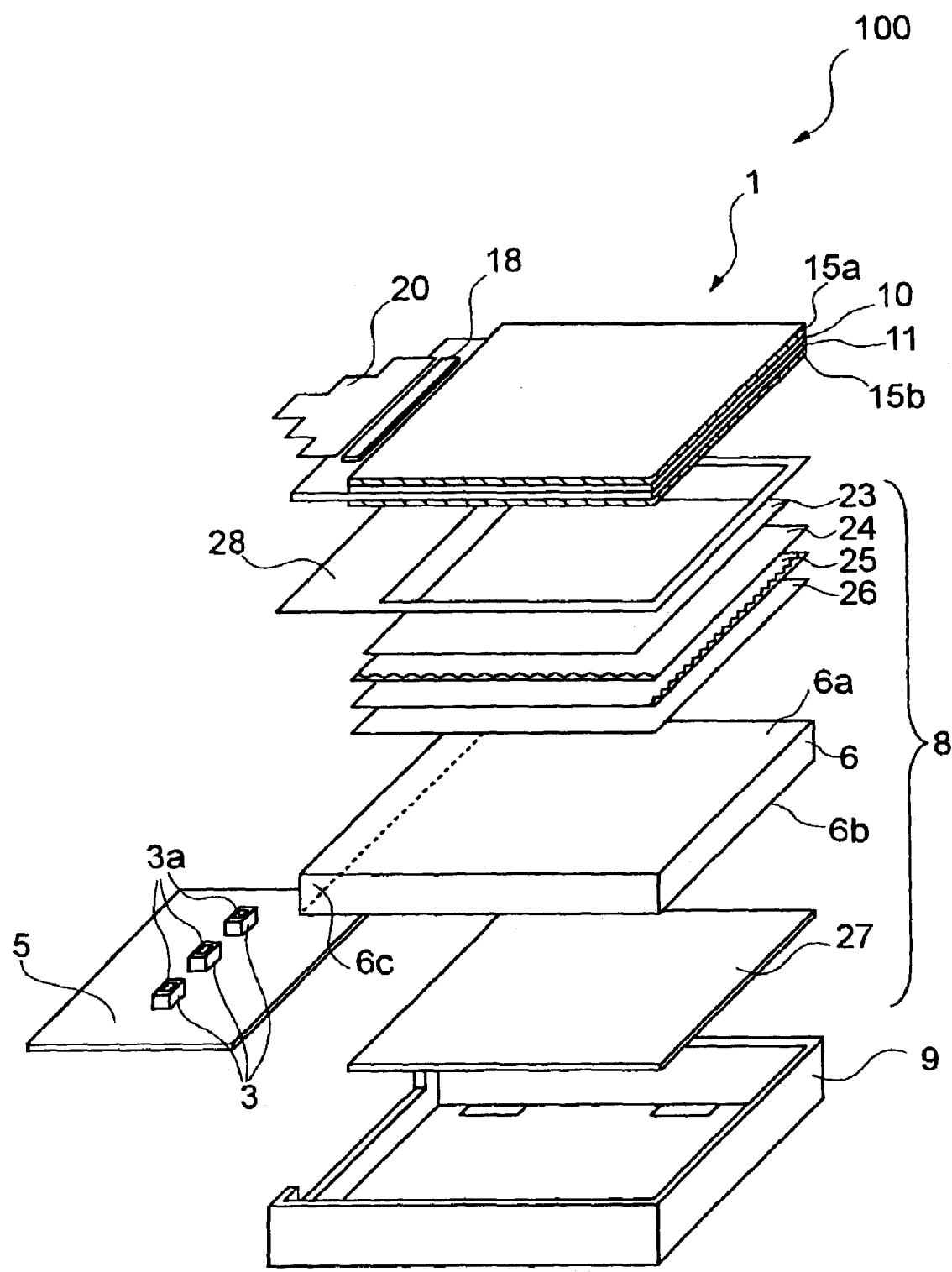
FIG. 11 is an exploded perspective view of the liquid crystal device according to a fourth embodiment of the present invention.
Figure 12:
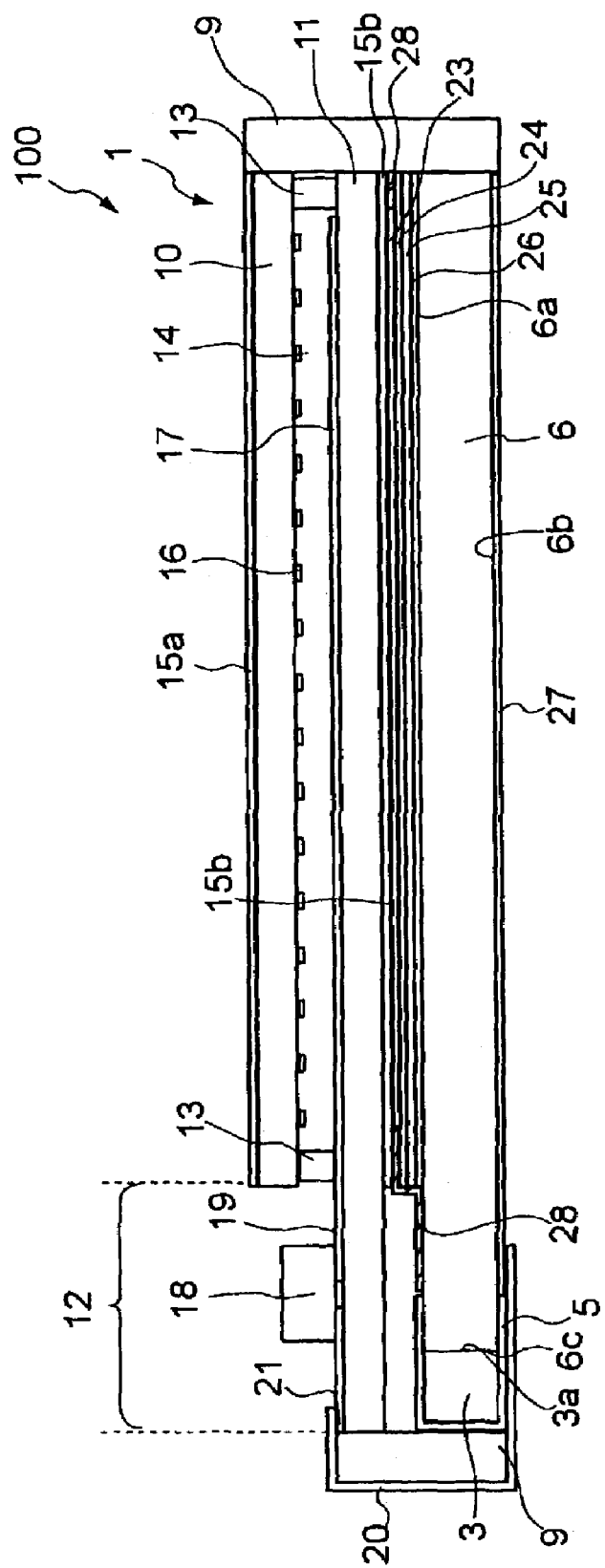
FIG. 12 is a schematic sectional view of the liquid crystal device according to the fourth embodiment of the present invention.

FIG. 11 is an exploded perspective view of the liquid crystal device according to a fourth embodiment of the present invention, and FIG. 12 is a schematic sectional view of the liquid crystal device of FIG. 11.

As shown in FIGS. 11 and 12, the liquid crystal device 100 is different from the one in the embodiments described above in the configuration and the arrangement of the radiating plate 5 in the liquid crystal device 100, and in that there is no substrate 7 which a white LED 3 is mounted on.

As shown in FIGS. 11 and 12, the liquid crystal device 100 includes a liquid crystal panel 1, an illuminating device 8, a frame-shaped adhesive sheet 28 for bonding the liquid crystal panel 1 and the illuminating device 8, and a case 9 for receiving these elements.

The liquid crystal panel 1 includes a first substrate 10, a second substrate 11 with a protruded region 12 extended from the first substrate 10, a seal material 13 disposed on the edge portion of the substrates for bonding the first substrate 10 and the second substrate 11, an STN liquid crystal 14 disposed in the space formed by the first substrate 10, the second substrate 11, and the seal material 13 as an electro-optical material, and a first polarizing plate 15a and a second polarizing plate 15b disposed for interposing a pair of the substrates therebetween.

On the surface of the first substrate 10 facing the second substrate 11, there are formed a first transparent electrode 16, which is shaped like a stripe, and includes a plurality of ITO (Indium Tin Oxide) films, and an alignment layer (not shown) made of polyimide, for example. to cover the first transparent electrode 16. On the other hand, on the surface of the second substrate 11 facing the first substrate 10, there are formed a second transparent electrode 17, which is shaped like a stripe and includes a plurality of ITO (Indium Tin Oxide) films to cross the first transparent electrode 16, and an alignment layer (not shown) made of polyimide, for example. to cover the second transparent electrode 17. In the liquid crystal device 100, a pixel is formed by the first transparent electrode 16 and the second transparent electrode 17 facing each other, and a liquid crystal 14 interposed therebetween. By selectively changing the voltage applied to each pixel, the optical characteristics of the liquid crystal 14 can be changed, and the light radiated from the illuminating device 8 can be modulated when being transmitted through the liquid crystal 14 corresponding to each pixel. By modulating the light as above, images or the like can be displayed, and driving regions, that is, a display unit in the liquid crystal panel 1 are almost equal to the region surrounded by the seal material 13.

The frame-shaped adhesive sheet 28 has light-shielding properties, and the opening of the adhesive sheet 28 includes driving regions. In addition, the reflectivity on the illuminating device 8 side of the adhesive sheet 28 is higher than that on the liquid crystal panel 1 side of the adhesive sheet 28. By the above configuration, the light is reflected from the light guide plate 6 side of the adhesive sheet 28 so as to decrease the loss of the light transmitted through the light guide plate 6, and the light from the liquid crystal panel 1 is absorbed on the liquid crystal panel 1 side of the adhesive sheet 28.

On the protruded portion 12, there are mounted a driving IC 18, a circuit 19, formed by extending the second transparent electrode 17, for electrically connecting the driving IC 18 to the second transparent electrode 17, and a terminal unit 21 for electrically connecting a circuit board 20 by the driving IC 18 and an ACF (anisotropic conductive film).

The illuminating device 8 is disposed adjacent to the second substrate 11 of the liquid crystal panel 1, and the second substrate 11 side of the liquid crystal panel 1 is the light-receiving side from the illuminating device 8, and the first substrate 10 side of the liquid crystal panel 1 is the light-emitting side of the light which is radiated from the illuminating device 8, passes through the inside of the liquid crystal panel 1, and is emitted from the liquid crystal panel 1.

Next, the configuration of the illuminating device is explained.

The illuminating device 8 includes a substantially rectangular-shaped light guide plate 6 with a first side 6a of the light-emitting side toward the second substrate 11 of the liquid crystal panel 1, a plurality of white LEDs 3 (three white LEDs 3 in this embodiment) as an optical source along the lateral side 6c of the light guide plate 6, a diffused plate 23, a prism sheet 24, a prism sheet 25, and a diffused plate 26 sequentially disposed as rectangular sheet-shaped optical parts between the liquid crystal panel 1 and the light guide plate 6 toward the liquid crystal panel 1 when assembling the liquid crystal device 100, and a rectangular sheet-shaped reflecting sheet 27 as an optical part disposed adjacent to a second side 6b facing the first side 6a as a light-emitting side of the light guide plate 6, and in addition, includes a radiating plate 5 as a radiating member and also as a substrate on which the white LED 3 is mounted. The radiating plate 5 is disposed in contact with the white LED 3, and disposed in contact with a part of the first side 6a and the second side 6b of the light guide plate 6.

The light guide plate 6 is intended to uniformly radiate the light from the white LED 3 onto the inner surface of the liquid crystal panel 1 for the liquid crystal panel 1 disposed corresponding to the light guide plate 6, and is made of acryl resin or polycarbonate, for example. The light emitted from the white LED 3 is radiated toward the lateral side 6c of the light guide plate 6 facing away from the first side 6a. The reflecting sheet 27 is intended to reflect the light from the light guide plate 6 on the liquid crystal panel 1 side. The diffused plates 23 and 26 are intended to make the brightness of the light inside a display screen more uniform. Two prism sheets 24, 25 are intended to adjust the alignment angle of the emitting light, and to improve the brightness of the front side.

In the illuminating device 8 of this embodiment, there is no substrate 7 on which the white LED is mounted, and one radiating plate 5 is disposed in contact with the portion of a plurality of white LEDs 3 (three in this embodiment) other than the light emitting part 3a of the white LED 3. In addition, the radiating plate 5 is disposed to coat a part of the first side 6a and the second side 6b of the light guide plate. In this embodiment, the radiating plate 5 has a configuration in which a metal layer 5b is formed over an adhesive layer 5a as in the first embodiment. Therefore, the radiating plate 5 of the present invention is bonded and fixed to the white LED 3 by the adhesive layer 5a. The metal layer used in the radiating plate 5 is preferably one having a high thermal conductivity, and more particularly, it is preferable to use metal having a thermal conductivity over 100 W/mK at room temperature. In the embodiment of the present invention, either a copper film or an aluminum film, which has high thermal conductivities and relatively low cost, is used. Of course, the invention is not limited to one layer made of one material as the metal layer, a metal layer made of different materials can be employed. The thickness of the metal layer 5b, is preferably, 10 μm to 1 mm. In the embodiment of the present invention, a copper film or an aluminum film with the thickness of 38 μm is used.

The radiating plate 5 is a flexible sheet-shaped member as shown in FIG. 12, and is illustrated not curved in FIG. 11.

By the above configuration including the white LED 3, the light guide plate 6 receiving the light from the white LED 3, and the flexible radiating plate 5 installed to coat the white LED 3, the heat generated from the white LED 3 when emitting light is radiated by the amount by which the contact surface of the radiating plate 5 and the white LED 3 is increased, and more than in the aforementioned embodiment so as to decrease the temperature on the white LED 3, more electric current can be flowed through the white LED 3 with decreased temperature, leading to an improvement in brightness of the white LED 3. That is, without the decrease of the efficiency of the light radiated from the white LED 3 to the light guide plate 6, the temperature on the white LED 3 can be decreased.

Fifth Embodiment

A simple matrix-typed liquid crystal device employing a COG type as one example of the electro-optical device according to the present invention will be explained referring to FIG. 13. In the third embodiment, the white LED 3 is mounted on the substrate 7, but in this embodiment, a white LED is mounted on a wiring substrate.

Figure 13:
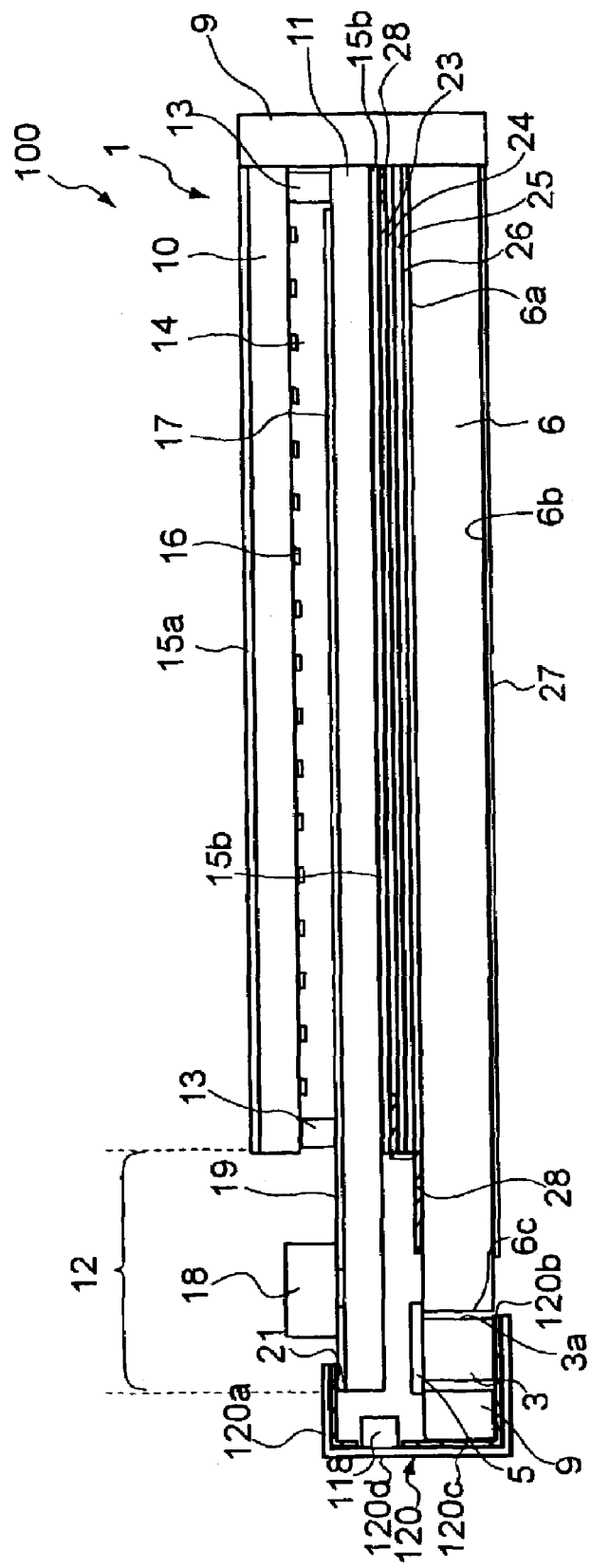
FIG. 13 is a schematic sectional view of the liquid crystal device according to a fifth embodiment of the present invention.

FIG. 13 is a schematic sectional view of the liquid crystal device according to the fifth embodiment of the present invention.

As shown in FIG. 13, the liquid crystal device 100 includes a liquid crystal panel 1, an illuminating device 8, a frame-shaped adhesive sheet 28 for bonding the liquid crystal panel 1 and the illuminating device 8, and a case 9 for receiving the illuminating device 8.

The liquid crystal panel 1 includes a first substrate 10, a second substrate 11 with a protruded region 12 extended from the first substrate 10, a seal material 13 disposed on the edge portion of the substrates for bonding the first substrate 10 and the second substrate 11, an STN liquid crystal 14 disposed in the space formed by the first substrate 10, the second substrate 11, and the seal material 13 as an electro-optical material, and a first polarizing plate 15a and a second polarizing plate 15b disposed for interposing a pair of the substrates therebetween.

On the surface of the first substrate 10 facing the second substrate 11, there are formed a first transparent electrode 16, which is shaped like a stripe, and includes a plurality of ITO (Indium Tin Oxide) films, and an alignment layer (not shown) made of polyimide, for example. to cover the first transparent electrode 16. On the other hand, on the surface of the second substrate 11 facing the first substrate 10, there are formed a second transparent electrode 17, which is shaped like a stripe and includes a plurality of ITO (Indium Tin Oxide) films to cross the first transparent electrode 16, and an alignment layer (not shown) made of polyimide, for example. to cover the second transparent electrode 17. In the liquid crystal device 100, a pixel is formed by the first transparent electrode 16 and the second transparent electrode 17 facing each other, and a liquid crystal 14 interposed therebetween. By selectively changing the voltage applied to each pixel, the optical characteristics of the liquid crystal 14 can be changed, and the light radiated from the illuminating device 8 can be modulated when being transmitted through the liquid crystal 14 corresponding to each pixel. By modulating the light as above, images or the like can be displayed, and driving regions, that is, a display unit in the liquid crystal panel 1 are almost equal to the region surrounded by the seal material 13.

The frame-shaped adhesive sheet 28 has light-shielding properties, and the opening of the adhesive sheet 28 includes driving regions. In addition, the reflectivity on the illuminating device 8 side of the adhesive sheet 28 is higher than that on the liquid crystal panel 1 side of the adhesive sheet 28. By the above configuration, the light is reflected from the light guide plate 6 side of the adhesive sheet 28 so as to decrease the loss of the light transmitted through the light guide plate 6, and the light from the liquid crystal panel 1 side is absorbed on the liquid crystal panel 1 side of the adhesive sheet 28.

On the protruded portion 12, there are mounted a driving IC 18, and a circuit 19, formed by extending the second transparent electrode 17, for electrically connecting the driving IC 18 to the second transparent electrode 17, and a terminal unit 21 for electrically connecting a circuit board 120 by the driving IC 18 and an ACF (anisotropic conductive film).

The illuminating device 8 is disposed adjacent to the second transparent substrate 11 of the liquid crystal panel 1, and the second substrate 11 side of the liquid crystal panel 1 is the light-receiving side from the illuminating device 8, and the first substrate 10 side of the liquid crystal panel 1 is the light-emitting side of the light which is radiated from the illuminating device 8, passes through the inside of the liquid crystal panel 1, and is emitted from the liquid crystal panel 1.

Next, the configuration of the illuminating device is explained.

The illuminating device 8 includes a substantially rectangular-shaped light guide plate 6 with a first side 6*a* of the light-emitting side toward the second substrate 11 of the liquid crystal panel 1, a plurality of white LEDs 3 (three white LEDs 3 in this embodiment) as an optical source along the lateral side 6*c* of the light guide plate 6, a diffused plate 23, a prism sheet 24, a prism sheet 25, and a diffused plate 26 sequentially disposed as rectangular sheet-shaped optical parts between the liquid crystal panel 1 and the light guide plate 6 toward the liquid crystal panel 1 when assembling the liquid crystal device 100, and a rectangular sheet-shaped reflecting sheet 27 as an optical part disposed adjacent to a second side 6*b* facing the first side 6*a* as a light-emitting side of the light guide plate 6. The white LED 3 is mounted on a circuit board 120, and the radiating plate 5 is disposed in contact with the white LED 3 on the opposite side to which the circuit board 120 is contacted. In this embodiment as in the first embodiment, the radiating plate 5 is formed such that a metal layer is formed over an adhesive layer. Therefore, the radiating plate 5 is bonded and fixed to the white LED 3 by the adhesive layer. As the metal layer used for the radiating plate 5, it is preferable to use the metal with a high thermal conductivity, and more particularly, it is preferable to use the metal having a thermal conductivity equal to or greater than 90 W/mK at room temperature. Of course, the invention is not limited to one layer made of one material as the metal layer, a metal layer made of different materials can be employed.

The light guide plate 6 is intended to uniformly radiate the light from the white LED 3 onto the inner surface of the liquid crystal panel 1 for the liquid crystal panel 1 disposed corresponding to the light guide plate 6, and is made of acryl resin or polycarbonate, for example. The light emitted from the white LED 3 is radiated toward the lateral side 6*c* of the light guide plate 6 facing away from the first side 6*a*. The reflecting sheet 27 is intended to reflect the light from the light guide plate 6 on the liquid crystal panel 1 side. The diffused plates 23 and 26 are intended to make the brightness of the light inside a display screen more uniform. Two prism sheets 24, 25 are intended to adjust the alignment angle of the emitting light, and to improve the brightness of the front side.

The three white LEDs 3 are mounted on the circuit board 120 having flexibility and which is electrically connected to the liquid crystal panel 1. The white LED 3 has a light emitting part 3*a* facing the light guide plate 6, and the light is emitted from the light emitting part 3*a* toward the light guide plate 6.

The circuit board 120 includes a film-shaped base 120*a* having a first side 120*c* and a second side 120*d*, which are made of polyimide, polyethylene, terephthalate, polyester, for example. On the first side 120*c* of the base 120*a* of the circuit board 120, there are formed, for example, a terminal unit 21 disposed on the protruded portion 12, and a copper circuit 120*b* conductively connected by ACF. In addition, on the circuit board 120, there are formed electronic elements including an IC chip 118 as a mounted component with a circuit (booster circuit, for example.) for producing the voltage to be applied to the first transparent electrode 16 and the second transparent electrode 17, a chip condenser (not shown) as a mounted component, or a resistor (not shown). The mounted components such as the IC chip 118, the chip condenser, or the resistor are mounted on the first side 120*c* of the base 120*a* in this embodiment. In addition, the white LED 3 is mounted on the first side 120*c* in the portion other than the portion where the mounted components and the copper circuit 120*b* are mounted or formed. In addition, in the description of other embodiments except this embodiment, the description on the aforementioned mounted components is omitted.

As described above, it is possible to provide the configuration where the white LED is mounted on the circuit board, and also, by installing the radiating plate 5 in this embodiment, the heat generated from the white LED 3 when emitting light is radiated by the radiating plate 5 so as to decrease the temperature on the white LED 3, and more electric current can be flowed through the white LED 3 with decreased temperature, leading to an improvement in brightness of the white LED 3. In addition, for example, five white LEDs are conventionally used for the illuminating device, but in this embodiment, just three white LEDs are enough for the illuminating device to provide the same value of brightness by the same amount of electric current as those in the conventional case so as to decrease the number of the employed components of the LEDs.

In addition, in this embodiment, the COG-typed liquid crystal device is described by, for example, the IC chip 118 including the circuit (booster circuit, for example.) for producing voltage applied to the first transparent electrode 16 and the second transparent electrode 17, the condenser, or the resistor as mounted components, but they can be employed on a COF-typed liquid crystal device. That is, the white LED can be mounted on the circuit board having a driving IC as a mounted component which is electrically connected to the liquid crystal panel mounted thereon.

Sixth Embodiment

A simple matrix liquid crystal device employing a COG type as one example of an electro-optical device of the present invention will be explained referring to FIG. 14. In the second embodiment, the liquid crystal panel is disposed such that the second substrate 11 with the protruded portion 12 is located toward the back light side, but in this embodiment, the liquid crystal panel is disposed such that the first substrate 10 with the protruded portion 12 is located toward the illuminating device 8.

Figure 14:
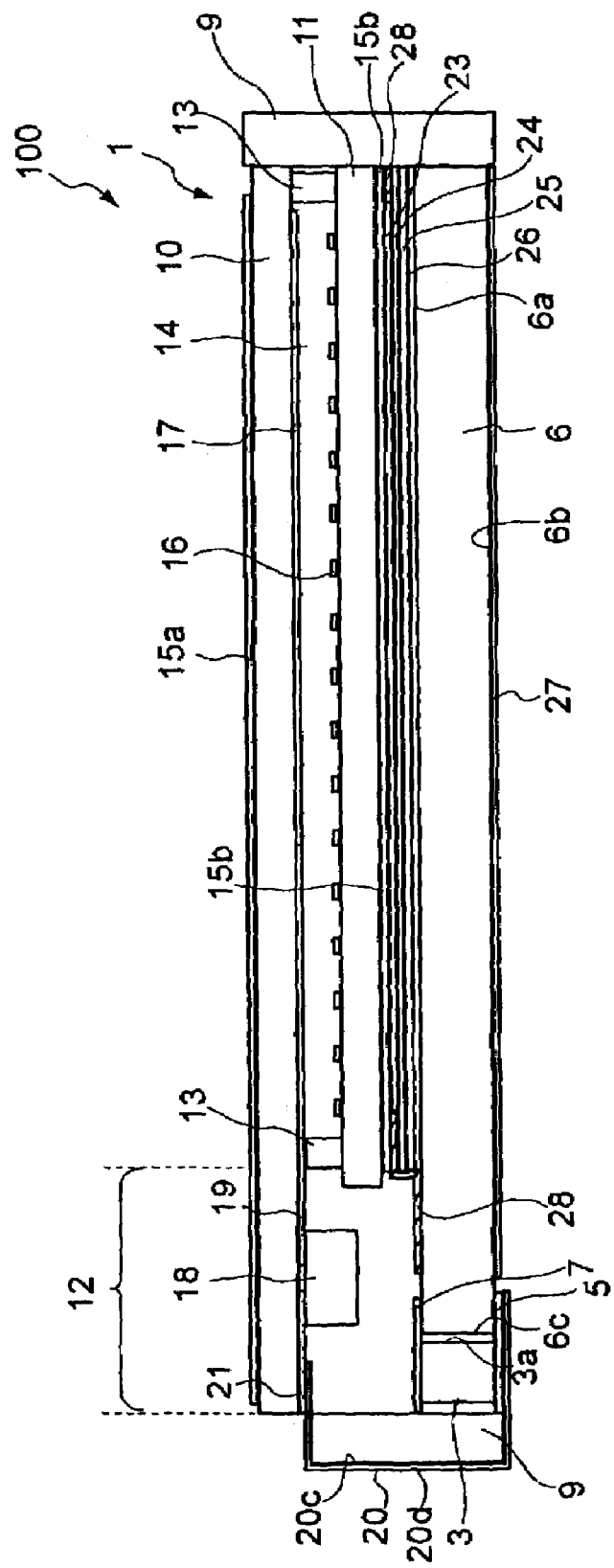
FIG. 14 is a schematic sectional view of the liquid crystal device according to a sixth embodiment of the present invention.

FIG. 14 is a schematic sectional view of the liquid crystal device according to the sixth embodiment.

As shown in FIG. 14, the liquid crystal device 100 includes a liquid crystal panel 1, an illuminating device 8, a frame-shaped adhesive sheet 28 for bonding the liquid crystal panel 1 and the illuminating device 8, and a case 9 for receiving the illuminating device 8.

The liquid crystal panel 1 includes a first substrate 10, a second substrate 11 with a protruded region 12 extended from the first substrate 10, a seal material 13 disposed on the edge portion of the substrates for bonding the first substrate 10 and the second substrate 11, an STN liquid crystal 14 disposed in the space formed by the first substrate 10, the second substrate 11, and the seal material 13 as an electro-optical material, and a first polarizing plate 15a and a second polarizing plate 15b disposed for interposing a pair of the substrates therebetween.

On the surface of the first substrate 10 facing the second substrate 11, there are formed a first transparent electrode 16, which is shaped like a stripe, and includes a plurality of ITO (Indium Tin Oxide) films, and an alignment layer (not shown) made of polyimide, for example. to cover the first transparent electrode 16. On the other hand, on the surface of the second substrate 11 facing the first substrate 10, there are formed a second transparent electrode 17, which is shaped like a stripe and includes a plurality of ITO (Indium Tin Oxide) films to cross the first transparent electrode 16, and an alignment layer (not shown) made of polyimide, for example. to cover the second transparent electrode 17. In the liquid crystal device 100, a pixel is formed by the first transparent electrode 16 and the second transparent electrode 17 facing each other, and a liquid crystal 14 interposed therebetween. By selectively changing the voltage applied to each pixel, the optical characteristics of the liquid crystal 14 can be changed, and the light radiated from the illuminating device 8 can be modulated when being transmitted through the liquid crystal 14 corresponding to each pixel. By modulating the light as above, images or the like can be displayed, and driving regions, that is, a display unit in the liquid crystal panel 1 are almost equal to the region surrounded by the seal material 13.

The frame-shaped adhesive sheet 28 has light-shielding properties, and the opening of the adhesive sheet 28 includes driving regions. In addition, the reflectivity on the illuminating device 8 side of the adhesive sheet 28 is higher than that on the liquid crystal panel 1 side of the adhesive sheet 28. By the above configuration, the light is reflected from the light guide plate 6 side of the adhesive sheet 28 so as to decrease the loss of the light transmitted through the light guide plate 6, and the light from the liquid crystal panel 1 side is absorbed on the liquid crystal panel 1 side of the adhesive sheet 28. In addition, the adhesive sheet 28 is disposed such that the white LED 3 is not overlapped with the mounted substrate 7 having the LED mounted thereon. According to the above configuration, since the substrate 7 and the adhesive sheet 28 do not overlap with the each other, it is possible to reduce the distance between the liquid crystal panel 1 and the light guide plate 6, and to make the thickness of the liquid crystal device 100 thin.

On the protruded portion 12, there are mounted a driving IC 18, and a circuit 19, formed by extending the second transparent electrode 17, for electrically connecting the driving IC 18 to the second transparent electrode 17, and a terminal unit 21 for electrically connecting a circuit board 20 by the driving IC 18 and an ACF (anisotropic conductive film).

The illuminating device 8 is disposed adjacent to the second substrate 11 of the liquid crystal panel 1, and the first substrate 10 side of the liquid crystal panel 1 is the light-receiving side from the illuminating device 8, and the second substrate 11 side of the liquid crystal panel 1 is the light-emitting side of the light which is radiated from the illuminating device 8, passes through the inside of the liquid crystal panel 1, and is emitted from the liquid crystal panel 1.

Next, the configuration of the illuminating device is explained.

The illuminating device 8 includes a substantially rectangular-shaped light guide plate 6 toward a first side 6a of the light-emitting side of the first substrate 10 of the liquid crystal panel 1, a plurality of white LEDs 3 (three white LEDs 3 in this embodiment) as an optical source along the lateral side 6c of the light guide plate 6, a diffused plate 23, a prism sheet 24, a prism sheet 25, and a diffused plate 26 sequentially disposed as rectangular sheet-shaped optical parts between the liquid crystal panel 1 and the light guide plate 6 toward the liquid crystal panel 1 when assembling the liquid crystal device 100, and a rectangular sheet-shaped reflecting sheet 27 as an optical part disposed adjacent to a second side 6b facing the first side 6a as a light-emitting side of the light guide plate 6, and in addition, includes a substrate 7 having the white LED 3 mounted thereon, and a radiating plate 5 disposed as a radiating member facing the substrate 7 through the white LED 3. The radiating plate 5 is disposed in contact with the white LED 3, and disposed in contact with a part of the second side 6b of the light guide plate 6.

The light guide plate 6 is intended to uniformly radiate the light from the white LED 3 onto the inner surface of the liquid crystal panel 1 for the liquid crystal panel 1 disposed corresponding to the light guide plate 6, and is made of acryl resin or polycarbonate, for example. The light emitted from the white LED 3 is radiated toward the lateral side 6c of the light guide plate 6 facing away from the first side 6a. The reflecting sheet 27 is intended to reflect the light from the light guide plate 6 on the liquid crystal panel 1 side. The diffused plates 23 and 26 are intended to make the brightness of the light inside a display screen more uniform. Two prism sheets 24, 25 are intended to adjust the alignment angle of the emitting light, and to improve the brightness of the front side.

Three white LEDs 3 ate mounted on the substrate 7. The white LED 3 has a light emitting part 3a facing the light guide plate 6, and the light is emitted from the light emitting part 3a toward the light guide plate 6. The radiating plate 5 has a configuration in which a metal layer is formed over an adhesive layer as in the first embodiment. Therefore, the radiating plate 5 of the present invention is bonded and fixed to the white LED 3 by the adhesive layer. It is preferable that the metal layer as a part of the radiating plate 5 has a high thermal conductivity, and more particularly, it is preferable to use metal having a thermal conductivity equal to or greater than 90 W/mK at room temperature. In the embodiment of the present invention, either a copper film or an aluminum film, which has high thermal conductivities and relatively low cost, is used. Of course, the invention is not limited to one layer made of one material as the metal layer, a metal layer made of different materials can be employed. The thickness of the metal layer, is preferably, 10 µm to 1 mm. In the embodiment of the present invention, a copper film or an aluminum film having the thickness of 38 µm is used. In addition, the radiating plate 5 is flexible sheet-shaped.

The radiating plate 5 is partially overlapped with the light guide plate 6 two-dimensionally, and the radiating plate 5 is disposed to integrally (simultaneously) cover three white LEDs 3. The radiating plate 5 is installed to contact the portion other than the light emitting part of the white LED 3, in other words, than the portion facing the light guide plate 6 and which is mounted on the substrate 7.

As described above, the heat generated from the white LED 3 is transmitted to the radiating plate 5, and can be radiated since the white LED 3 contacts the radiating plate 5 having a high thermal conductivity.

As described above, it can be employed on a liquid crystal device in which the second substrate 11 with the protruded portion 12 is disposed to face the illuminating device 8 through the first substrate 10. By the above configuration including the white LED 3, the light guide plate 6 receiving the light from the white LED 3, and the radiating plate 5 installed to contact the white LED 3, the heat generated from the white LED 3 when emitting light is radiated by the radiating plate 5 so as to decrease the temperature on the white LED 3, and more electric current can be flowed through the white LED 3 with decreased temperature, leading to an improvement in brightness of the white Led 3. In addition, for example, five white LEDs are conventionally used for the illuminating device, but in the embodiment of the present invention, just three white LEDs are enough for the illuminating device to provide the same value of the brightness by the same amount of the electric current as those in the conventional case so as to decrease the number of the employed components of the LEDs.

Seventh Embodiment

A simple matrix liquid crystal device employing a COG type as one example of the electro-optical device according to the present invention will be explained referring to FIGS. 15 and 16.

Figure 15:
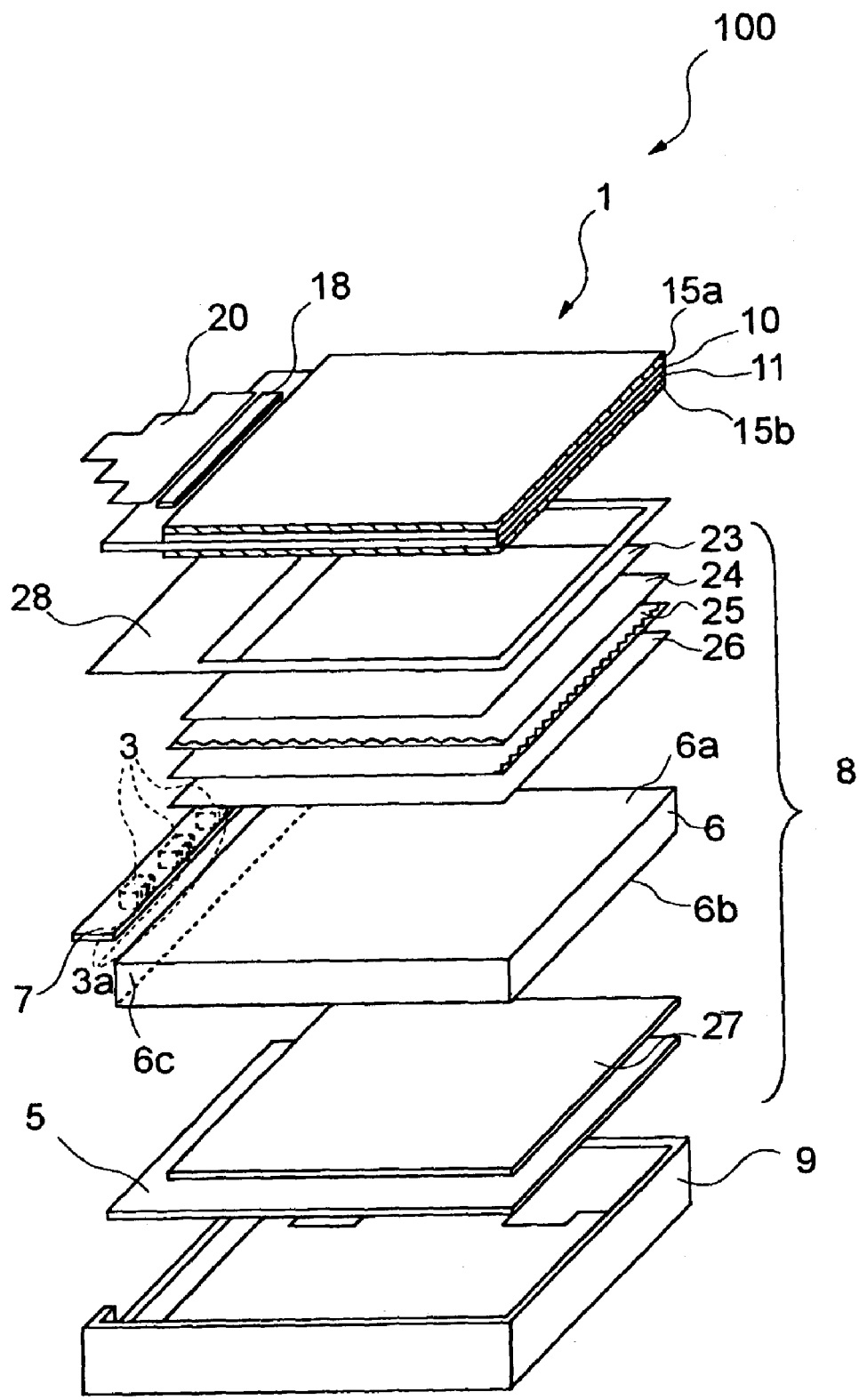
FIG. 15 is an exploded perspective view of the liquid crystal device according to a seventh embodiment of the present invention.
Figure 16:
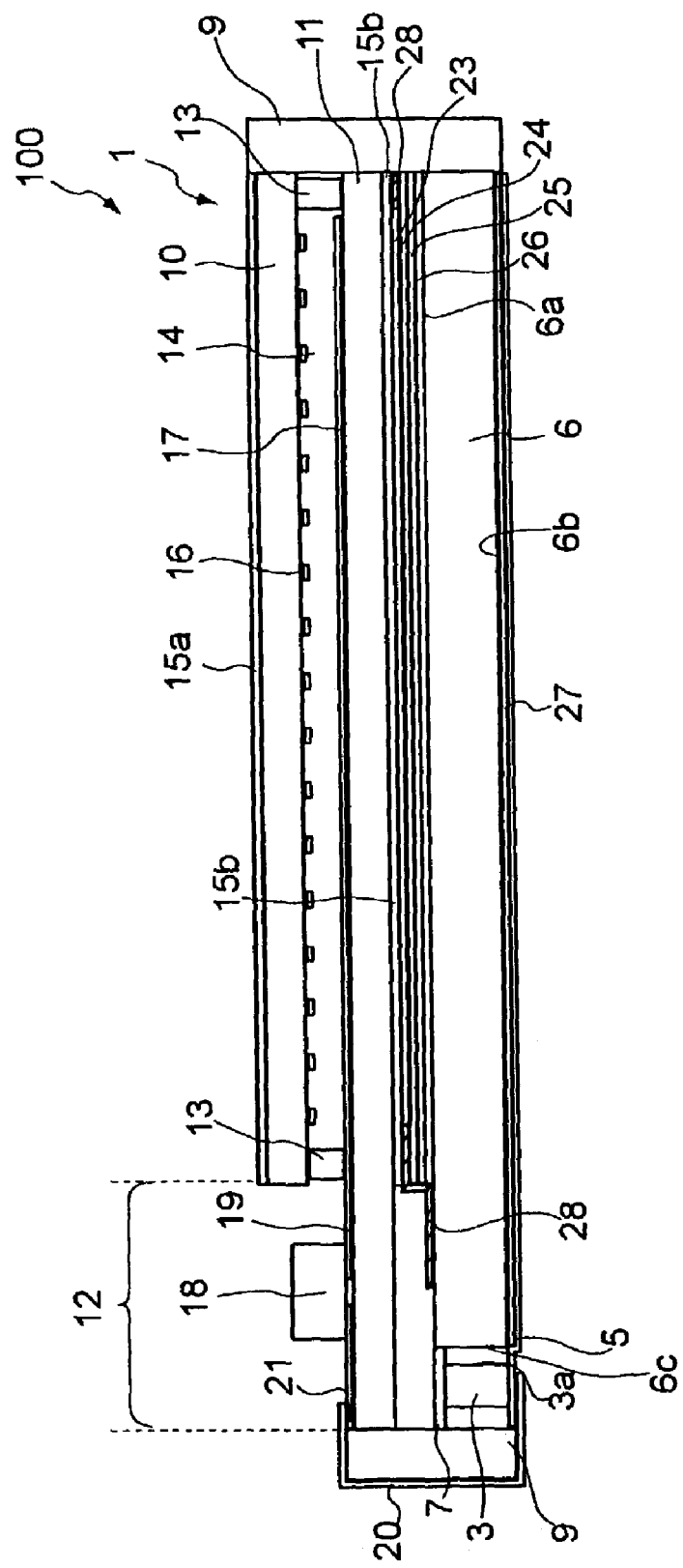
FIG. 16 is a schematic sectional view of the liquid crystal device according to the seventh embodiment of the present invention.

FIG. 15 is an exploded perspective view of the liquid crystal device according to a seventh embodiment of the present invention, and FIG. 16 is a schematic sectional view of the liquid crystal device of FIG. 15.

The configuration of the seventh embodiment is different from the one of the second embodiment in enlarging the shape of the radiating plate 5.

As shown in FIGS. 15 and 16, the liquid crystal device 100 includes a liquid crystal panel 1, an illuminating device 8, a frame-shaped adhesive sheet 28 for bonding the liquid crystal panel 1 and the illuminating device 8, and a case 9 for receiving these elements.

The liquid crystal panel 1 includes a first substrate 10, a second substrate 11 with a protruded region 12 extended from the first substrate 10, a seal material 13 disposed on the edge portion of the substrates for bonding the first substrate 10 and the second substrate 11, an STN liquid crystal 14 disposed in the space formed by the first substrate 10, the second substrate 11, and the seal material 13 as an electro-optical material, and a first polarizing plate 15a and a second polarizing plate 15b disposed for interposing a pair of the substrates therebetween.

On the surface of the first substrate 10 facing the second substrate 11, there are formed a first transparent electrode 16, which is shaped like a stripe, and includes a plurality of ITO (Indium Tin Oxide) films, and an alignment layer (not shown) made of polyimide, for example. to cover the first transparent electrode 16. On the other hand, on the surface of the second substrate 11 facing the first substrate 10, there are formed a second transparent electrode 17, which is shaped like a stripe and includes a plurality of ITO (Indium Tin Oxide) films to cross the first transparent electrode 16, and an alignment layer (not shown) made of polyimide, for example. to cover the second transparent electrode 17. In the liquid crystal device 100, a pixel is formed by the first transparent electrode 16 and the second transparent electrode 17 facing each other, and a liquid crystal 14 interposed therebetween. By selectively changing the voltage applied to each pixel, the optical characteristics of the liquid crystal 14 can be changed, and the light radiated from the illuminating device 8 can be modulated when being transmitted through the liquid crystal 14 corresponding to each pixel. By modulating the light as above, images or the like can be displayed, and driving regions, that is, a display unit in the liquid crystal panel 1 are almost equal to the region surrounded by the seal material 13.

The frame-shaped adhesive sheet 28 has light-shielding properties, and the opening of the adhesive sheet 28 includes driving regions. In addition, the reflectivity on the illuminating device 8 side of the adhesive sheet 28 is higher than that on the liquid crystal panel 1 side of the adhesive sheet 28. By the above configuration, the light is reflected from the light guide plate 6 side of the adhesive sheet 28 so as to decrease the loss of the light transmitted through the light guide plate 6, and the light from the liquid crystal panel 1 is absorbed on the liquid crystal panel 1 side of the adhesive sheet 28. In addition, the adhesive sheet 28 is installed so that it does not overlap with the substrate 7 on which the white LED 3 is mounted. Since the substrate 7 and the adhesive sheet 28 do not overlap with the each other, it is possible to reduce the distance between the liquid crystal panel 1 and the light guide plate 6, and make the thickness of the liquid crystal device 100 thin.

On the protruded portion 12, there are mounted a driving IC 18, and a circuit 19, formed by extending the second transparent electrode 17, for electrically connecting the driving IC 18 to the second transparent electrode 17, and a terminal unit 21 for electrically connecting a circuit board 20 by the driving IC 18 and an ACF (anisotropic conductive film).

The illuminating device 8 is disposed adjacent to the second transparent substrate 11 of the liquid crystal panel 1, and the second substrate 11 side of the liquid crystal panel 1 is the light-receiving side from the illuminating device 8, and the first substrate 10 side of the liquid crystal panel 1 is the light-emitting side of the light which is radiated from the illuminating device 8, passes through the inside of the liquid crystal panel 1, and is emitted from the liquid crystal panel 1.

Next, the configuration of the illuminating device is explained.

The illuminating device 8 includes a substantially rectangular-shaped light guide plate 6 with a first side 6a of the light-emitting side toward the second substrate 11 of the liquid crystal panel 1, a plurality of white LEDs 3 (three white LEDs 3 in this embodiment) as an optical source along the lateral side 6c of the light guide plate 6, a diffused plate 23, a prism sheet 24, a prism sheet 25, and a diffused plate 26 sequentially disposed as rectangular sheet-shaped optical parts between the liquid crystal panel 1 and the light guide plate 6 toward the liquid crystal panel 1 when assembling the liquid crystal device 100, and a rectangular sheet-shaped reflecting sheet 27 as an optical part disposed adjacent to a second side 6b facing the first side 6a as a light-emitting side of the light guide plate 6, and in addition, includes a substrate 7 having the white LED 3 mounted thereon, and a radiating plate 5 disposed as a radiating member facing the substrate 7 through the white LED 3. The radiating plate 5 is disposed in contact with the white LED 3, and disposed in contact with a part of the second side 6b of the light guide plate 6.

The light guide plate 6 is intended to uniformly radiate the light from the white LED 3 onto the inner surface of the liquid crystal panel 1 for the liquid crystal panel 1 disposed corresponding to the light guide plate 6, and is made of acryl resin or polycarbonate, for example. The light emitted from the white LED 3 is radiated toward the lateral side 6c of the light guide plate 6 facing away from the first side 6a. The reflecting sheet 27 is intended to reflect the light from the light guide plate 6 on the liquid crystal panel 1 side. The diffused plates 23 and 26 are intended to make the brightness of the light inside a display screen more uniform. Two prism sheets 24, 25 are intended to adjust the alignment angle of the emitting light, and to improve the brightness of the front side.

Three white LEDs 3 are mounted on the substrate 7. The white LED 3 has a light emitting part 3a facing the light guide plate 6, and the light is emitted from the light emitting part 3a toward the light guide plate 6. The radiating plate 5 has a configuration in which a metal layer is formed over an adhesive layer as in the first embodiment. Therefore, the radiating plate 5 of the present invention is bonded and fixed to the white LED 3 by the adhesive layer. It is preferable that the metal layer as a part of the radiating plate 5 has a high thermal conductivity, and more particularly, it is preferable to use metal having a thermal conductivity equal to or greater than 90 W/mK at room temperature. In the embodiment of the present invention, either a copper film or an aluminum film, which has high thermal conductivities and relatively low cost, is used. Of course, the invention is not limited to one layer made of one material as the metal layer, a metal layer made of different materials can be employed. The thickness of the metal layer, is preferably, 10 μm to 1 mm. In the embodiment of the present invention, a copper film or an aluminum film having the thickness of 38 μm is used. In addition, the radiating plate 5 is flexible sheet-shaped.

In this embodiment, the radiating plate 5 is disposed in contact with the white LED 3, and is extended to be overlapped with almost the whole reflecting sheet 27, and the light guide plate 6 and the radiating plate 5 are disposed to face with each other through the reflecting sheet 27. According to the above configuration, since the width of the radiating plate 5 is increased, the heat generated from the white LED 3 can be more radiated. Therefore, the heat generated from the white LED 3 when emitting light is radiated by the radiating plate 5 so as to decrease the temperature on the white LED 3, and more electric current can be flowed through the white LED 3 with decreased temperature, leading to an improvement in brightness of the white Led 3. In addition, for example, five white LEDs are conventionally used for the illuminating device, but in the embodiment of the present invention, just three white LEDs are enough for the illuminating device to provide the same value of the brightness by the same amount of the electric current as those in the conventional case so as to decrease the number of the employed components of the LEDs.

Eighth Embodiment

A simple matrix liquid crystal device employing a COG type as one example of the electro-optical device according to the present invention will be explained referring to FIGS. 17 and 18.

Figure 17:
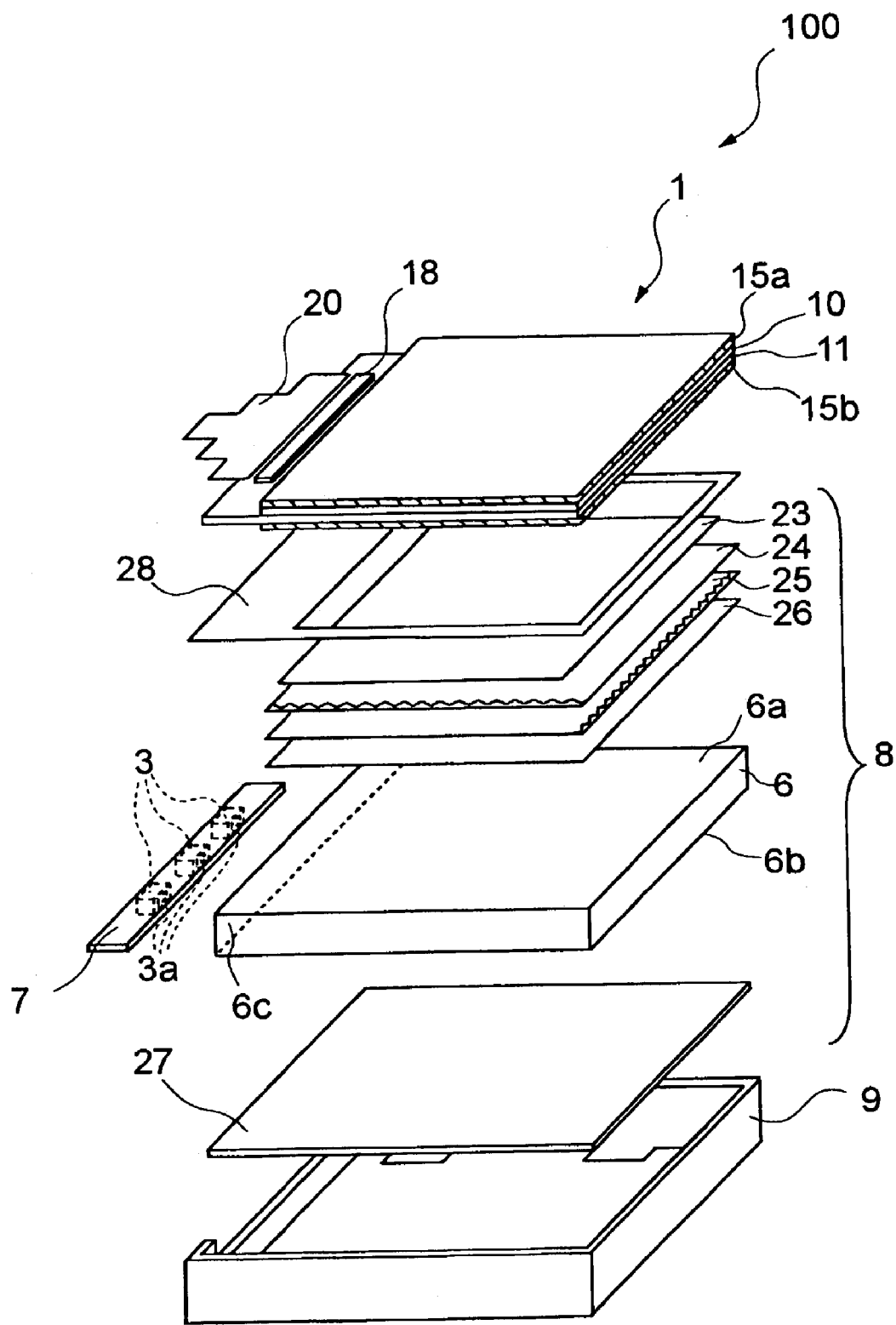
FIG. 17 is an exploded perspective view of the liquid crystal device according to an eight embodiment of the present invention.
Figure 18:
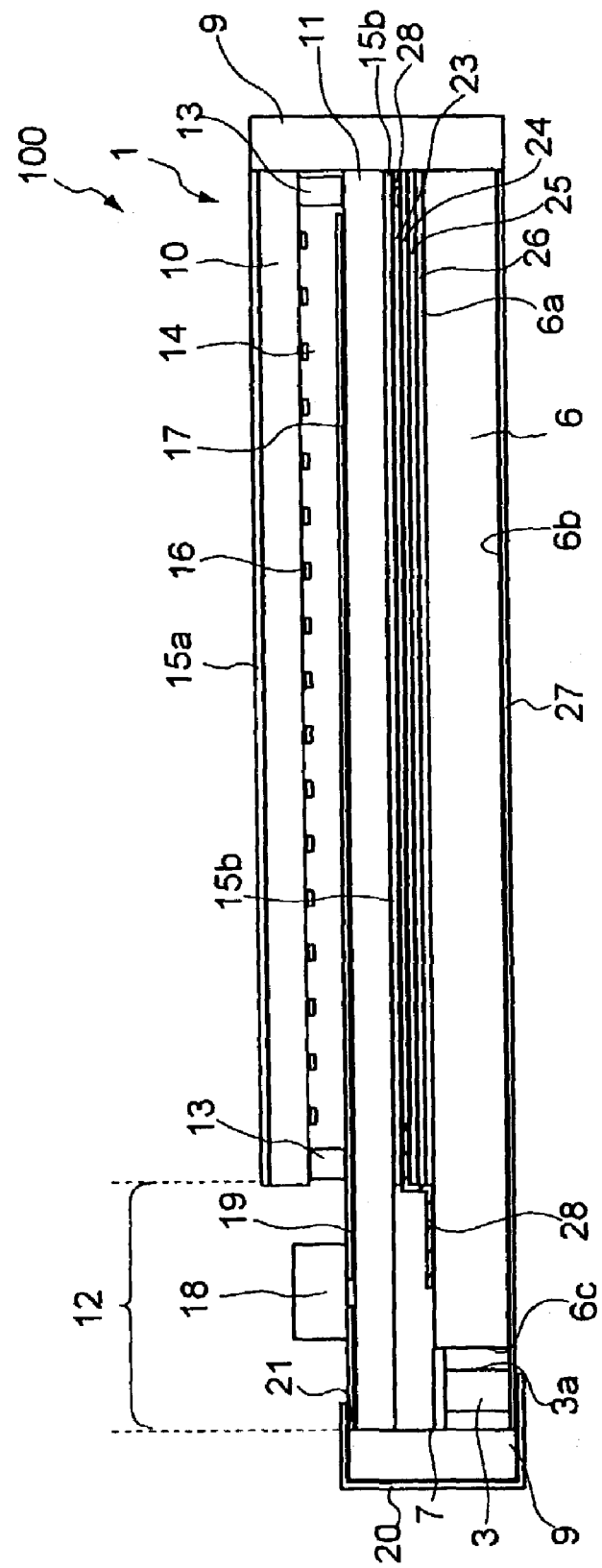
FIG. 18 is a schematic sectional view of the liquid crystal device according to the eighth embodiment of the present invention.

FIG. 17 is an exploded perspective view of the liquid crystal device according to an eighth embodiment of the present invention, and FIG. 18 is a schematic sectional view of the liquid crystal device of FIG. 17.

In this embodiment, the configuration is different from the second embodiment in that the reflecting sheet 27 is made to function as a radiating plate so as to radiate without the installation of the radiating plate 5.

As shown in FIGS. 17 and 18, the liquid crystal device 100 includes a liquid crystal panel 1, an illuminating device 8, a frame-shaped adhesive sheet 28 for bonding the liquid crystal panel 1 and the illuminating device 8, and a case 9 for receiving these elements.

The liquid crystal panel 1 includes a first substrate 10, a second substrate 11 with a protruded region 12 extended from the first substrate 10, a seal material 13 disposed on the edge portion of the substrates for bonding the first substrate 10 and the second substrate 11, an STN liquid crystal 14 disposed in the space formed by the first substrate 10, the second substrate 11, and the seal material 13 as an electro-optical material, and a first polarizing plate 15a and a second polarizing plate 15b disposed for interposing a pair of the substrates therebetween.

On the surface of the first substrate 10 facing the second substrate 11, there are formed a first transparent electrode 16, which is shaped like a stripe, and includes a plurality of ITO (Indium Tin Oxide) films, and an alignment layer (not shown) made of polyimide, for example. to cover the first transparent electrode 16. On the other hand, on the surface of the second substrate 11 facing the first substrate 10, there are formed a second transparent electrode 17, which is shaped like a stripe and includes a plurality of ITO (Indium Tin Oxide) films to cross the first transparent electrode 16, and an alignment layer (not shown) made of polyimide, for example. to cover the second transparent electrode 17. In the liquid crystal device 100, a pixel is formed by the first transparent electrode 16 and the second transparent electrode 17 facing each other, and a liquid crystal 14 interposed therebetween. By selectively changing the voltage applied to each pixel, the optical characteristics of the liquid crystal 14 can be changed, and the light radiated from the illuminating device 8 can be modulated when being transmitted through the liquid crystal 14 corresponding to each pixel. By modulating the light as above, images or the like can be displayed, and driving regions, that is, a display unit in the liquid crystal panel 1 are almost equal to the region surrounded by the seal material 13.

The frame-shaped adhesive sheet 28 has light-shielding properties, and the opening of the adhesive sheet 28 includes driving regions. In addition, the reflectivity on the illuminating device 8 side of the adhesive sheet 28 is higher than that on the liquid crystal panel 1 side of the adhesive sheet 28. By the above configuration, the light is reflected from the light guide plate 6 side of the adhesive sheet 28 so as to decrease the loss of the light transmitted through the light guide plate 6, and the light from the liquid crystal panel 1 side is absorbed on the liquid crystal panel 1 side of the adhesive sheet 28. In addition, the adhesive sheet 28 is disposed such that the white LED 3 is not overlapped with the substrate 7 having the LED mounted thereon. According to the above configuration, since the substrate 7 and the adhesive sheet 28 do not overlap with the each other, it is possible to reduce the distance between the liquid crystal panel 1 and the light guide plate 6, and to make the thickness of the liquid crystal device 100 thin.

On the protruded portion 12, there are mounted a driving IC 18, and a circuit 19, formed by extending the second transparent electrode 17, for electrically connecting the driving IC 18 to the second transparent electrode 17, and a terminal unit 21 for electrically connecting a circuit board 20 by the driving IC 18 and an ACF (anisotropic conductive film).

The illuminating device 8 is disposed adjacent to the second transparent substrate 11 of the liquid crystal panel 1, and the second substrate 11 side of the liquid crystal panel 1 is the light-receiving side from the illuminating device 8, and the first substrate 10 side of the liquid crystal panel 1 is the light-emitting side of the light which is radiated from the illuminating device 8, passes through the inside of the liquid crystal panel 1, and is emitted from the liquid crystal panel 1.

Next, the configuration of the illuminating device is explained.

The illuminating device 8 includes a substantially rectangular-shaped light guide plate 6 with a first side 6a of the light-emitting side toward the second substrate 11 of the liquid crystal panel 1, a plurality of white LEDs 3 (three white LEDs 3 in this embodiment) as an optical source along the lateral side 6c of the light guide plate 6, a diffused plate 23, a prism sheet 24, a prism sheet 25, and a diffused plate 26 sequentially disposed as rectangular sheet-shaped optical parts between the liquid crystal panel 1 and the light guide plate 6 toward the liquid crystal panel 1 when assembling the liquid crystal device 100, and a rectangular sheet-shaped reflecting sheet 27 as an optical part disposed adjacent to a second side 6b facing the first side 6a as a light-emitting side of the light guide plate 6. The reflecting sheet 27 extends to contact the white LED 3 while it is disposed in contact with the light guide plate. In this embodiment, for example, the reflecting sheet 27 is made of the material having a high thermal conductivity such as silver or aluminum, and the reflecting sheet 27 is made to have a radiation function.

The light guide plate 6 is intended to uniformly radiate the light from the white LED 3 onto the inner surface of the liquid crystal panel 1 for the liquid crystal panel 1 disposed corresponding to the light guide plate 6, and is made of acryl resin or polycarbonate, for example. The light emitted from the white LED 3 is radiated toward the lateral side 6c of the light guide plate 6 facing away from the first side 6a. The reflecting sheet 27 is intended to reflect the light from the light guide plate 6 on the liquid crystal panel 1 side. The diffused plates 23 and 26 are intended to make the brightness of the light inside a display screen more uniform. Two prism sheets 24, 25 are intended to adjust the alignment angle of the emitting light, and to improve the brightness of the front side.

Three white LEDs 3 are mounted on the substrate 7. The white LED 3 has a light emitting part 3a facing the light guide plate 6, and the light is emitted from the light emitting part 3a toward the light guide plate 6.

In this embodiment, by installing the reflecting sheet 27 made of the material having a high thermal conductivity to be contacted to the white LED 3, the heat generated from the white LED 3 when emitting light is radiated by the reflecting sheet 27 so as to decrease the temperature on the white LED 3, and more electric current can be flowed through the white LED 3 with decreased temperature, leading to an improvement in brightness of the white Led 3. In addition, for example, five white LEDs are conventionally used for the illuminating device, but in the embodiment of the present invention, just three white LEDs are enough for the illuminating device to provide the same value of the brightness by the same amount of the electric current as those in the conventional case so as to decrease the number of the employed components of the LEDs.

Ninth Embodiment

A simple matrix liquid crystal device employing a COG type as one example of the electro-optical device according to the present invention will be explained referring to FIGS. 19 and 20.

In this embodiment, the configuration is different form the one in the second embodiment in employing Peltier element instead of the radiating plate 5.

Figure 19:
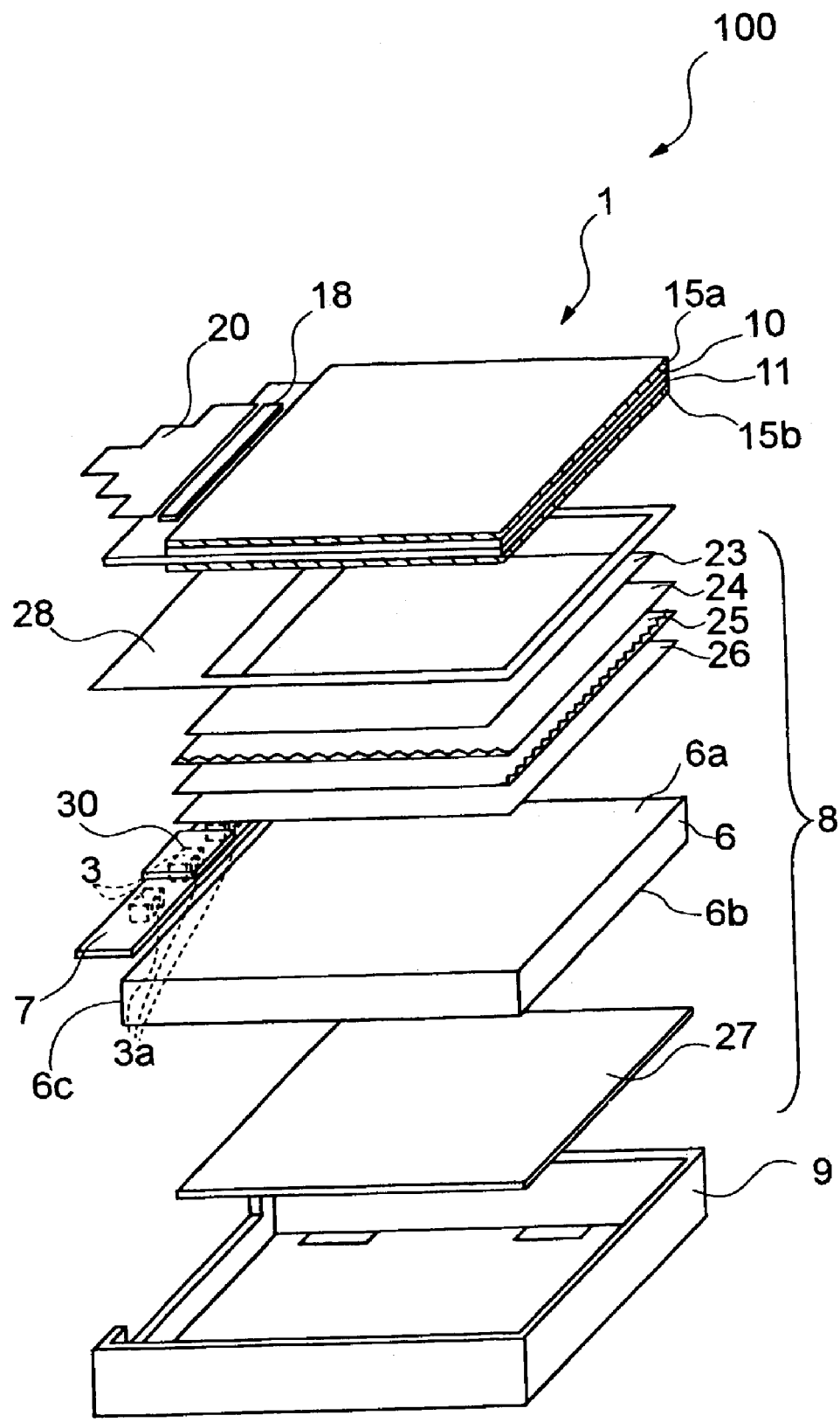
FIG. 19 is an exploded perspective view of the liquid crystal device according to a ninth embodiment of the present invention.
Figure 20:
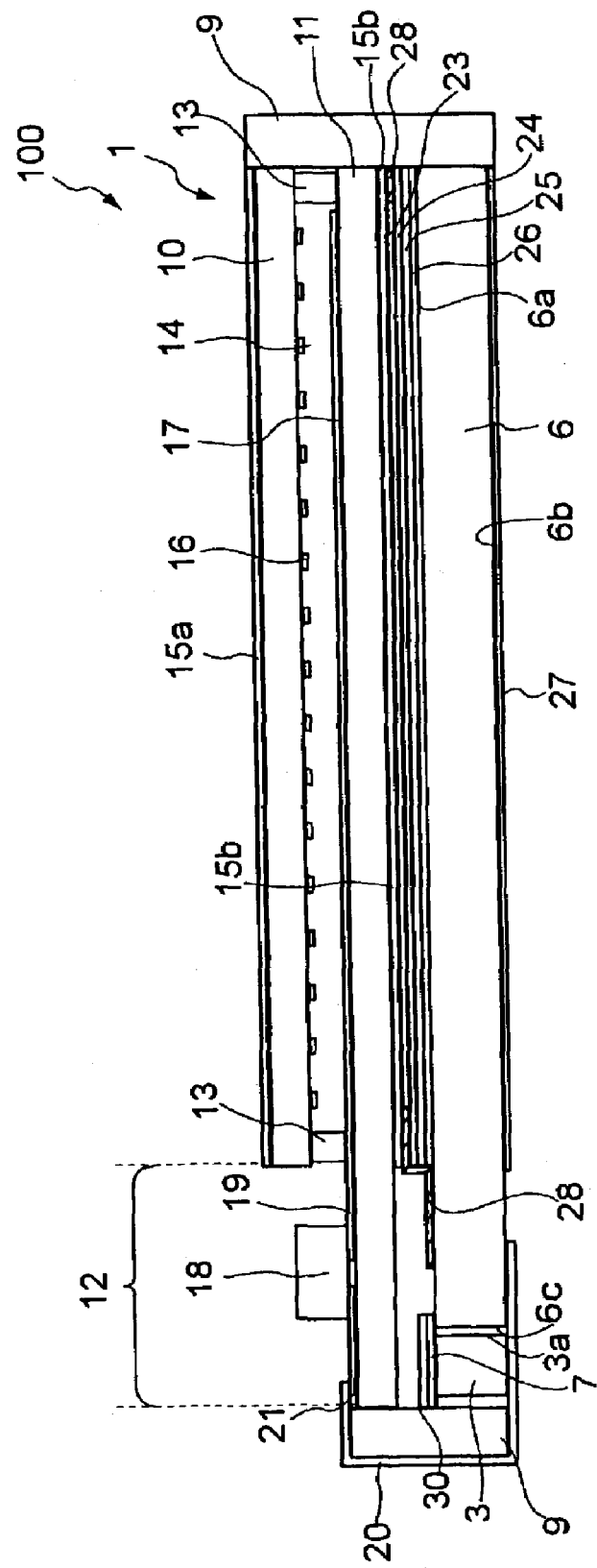
FIG. 20 is a schematic sectional view of the liquid crystal device according to the ninth embodiment of the present invention.

FIG. 19 is an exploded perspective view of the liquid crystal device according to a ninth embodiment of the present invention, and FIG. 20 is a schematic sectional view of the liquid crystal device of FIG. 19.

As shown in FIGS. 19 and 20, the liquid crystal device 100 includes a liquid crystal panel 1, an illuminating device 8, a frame-shaped adhesive sheet 28 for bonding the liquid crystal panel 1 and the illuminating device 8, and a case 9 for receiving these elements.

The liquid crystal panel 1 includes a first substrate 10, a second substrate 11 with a protruded region 12 extended from the first substrate 10, a seal material 13 disposed on the edge portion of the substrates for bonding the first substrate 10 and the second substrate 11, an STN liquid crystal 14 disposed in the space formed by the first substrate 10, the second substrate 11, and the seal material 13 as an electro-optical material, and a first polarizing plate 15a and a second polarizing plate 15b disposed for interposing a pair of the substrates therebetween.

On the surface of the first substrate 10 facing the second substrate 11, there are formed a first transparent electrode 16, which is shaped like a stripe, and includes a plurality of ITO (Indium Tin Oxide) films, and an alignment layer (not shown) made of polyimide, for example. to cover the first transparent electrode 16. On the other hand, on the surface of the second substrate 11 facing the first substrate 10, there are formed a second transparent electrode 17, which is shaped like a stripe and includes a plurality of ITO (Indium Tin Oxide) films to cross the first transparent electrode 16, and an alignment layer (not shown) made of polyimide, for example. to cover the second transparent electrode 17. In the liquid crystal device 100, a pixel is formed by the first transparent electrode 16 and the second transparent electrode 17 facing each other, and a liquid crystal 14 interposed therebetween. By selectively changing the voltage applied to each pixel, the optical characteristics of the liquid crystal 14 can be changed, and the light radiated from the illuminating device 8 can be modulated when being transmitted through the liquid crystal 14 corresponding to each pixel. By modulating the light as above, images or the like can be displayed, and driving regions, that is, a display unit in the liquid crystal panel 1 are almost equal to the region surrounded by the seal material 13.

The frame-shaped adhesive sheet 28 has light-shielding properties, and the opening of the adhesive sheet 28 includes driving regions. In addition, the reflectivity on the illuminating device 8 side of the adhesive sheet 28 is higher than that on the liquid crystal panel 1 side of the adhesive sheet 28. By the above configuration, the light is reflected from the light guide plate 6 side of the adhesive sheet 28 so as to decrease the loss of the light transmitted through the light guide plate 6, and the light from the liquid crystal panel 1 side is absorbed on the liquid crystal panel 1 side of the adhesive sheet 28. In addition, the adhesive sheet 28 is disposed such that the white LED 3 is not overlapped with the substrate 7 having the LED mounted thereon. According to the above configuration, since the substrate 7 and the adhesive sheet 28 do not overlap with the each other, it is possible to reduce the distance between the liquid crystal panel 1 and the light guide plate 6, and to make the thickness of the liquid crystal device 100 thin.

On the protruded portion 12, there are mounted a driving IC 18, and a circuit 19, formed by extending the second transparent electrode 17, for electrically connecting the driving IC 18 to the second transparent electrode 17, and a terminal unit 21 for electrically connecting a circuit board 20 by the driving IC 18 and an ACF (anisotropic conductive film).

The illuminating device 8 is disposed adjacent to the second transparent substrate 11 of the liquid crystal panel 1, and the second substrate 11 side of the liquid crystal panel 1 is the light-receiving side from the illuminating device 8, and the first substrate 10 side of the liquid crystal panel 1 is the light-emitting side of the light which is radiated from the illuminating device 8, passes through the inside of the liquid crystal panel 1, and is emitted from the liquid crystal panel 1.

Next, the configuration of the illuminating device is explained.

The illuminating device 8 includes a substantially rectangular-shaped light guide plate 6 with a first side 6a of the light-emitting side toward the second substrate 11 of the liquid crystal panel 1, a plurality of white LEDs 3 (three white LEDs 3 in this embodiment) as an optical source along the lateral side 6c of the light guide plate 6, a diffused plate 23, a prism sheet 24, a prism sheet 25, and a diffused plate 26 sequentially disposed as rectangular sheet-shaped optical parts between the liquid crystal panel 1 and the light guide plate 6 toward the liquid crystal panel 1 when assembling the liquid crystal device 100, and a rectangular sheet-shaped reflecting sheet 27 as an optical part disposed adjacent to a second side 6b facing the first side 6a as a light-emitting side of the light guide plate 6, and in addition, includes a substrate 7 having the white LED 3 mounted thereon, and a Peltier element 30 disposed facing the white LED 3 through the substrate 7.

The light guide plate 6 is intended to uniformly radiate the light from the white LED 3 onto the inner surface of the liquid crystal panel 1 for the liquid crystal panel 1 disposed corresponding to the light guide plate 6, and is made of acryl resin or polycarbonate, for example. The light emitted from the white LED 3 is radiated toward the lateral side 6c of the light guide plate 6 facing away from the first side 6a. The reflecting sheet 27 is intended to reflect the light from the light guide plate 6 on the liquid crystal panel 1 side. The diffused plates 23 and 26 are intended to make the brightness of the light inside a display screen more uniform. Two prism sheets 24, 25 are intended to adjust the alignment angle of the emitting light, and to improve the brightness of the front side.

Three white LEDs 3 are mounted on the substrate 7. The white LED 3 has a light emitting part 3a facing the light guide plate 6, and the light is emitted from the light emitting part 3a toward the light guide plate 6. One Peltier element 30 is disposed and fixed on the side of the substrate 7 opposite to the side where the white LED 3 is mounted.

The Peltier element 30 is an element causing the phenomenon that one side thereof gets hot and the other side thereof gets cool when electric current flows therethrough. In this embodiment, the Peltier element 30 is disposed such that the side which is cooled when electric current flows through contacts the substrate 7. By installing the Peltier element 30 as above, the heat generated from the white LED 3 can be actively cooled so as to decrease the temperature on the surface of the white LED 3. Therefore, since more electric current is allowed to flow through the white LED 3 with decreased temperature, it is possible to improve the brightness of the white LED 3.

Tenth Embodiment

A simple matrix liquid crystal device employing a COG type as one example of the electro-optical device according to the present invention will be explained referring to FIG. 21.

Figure 21:
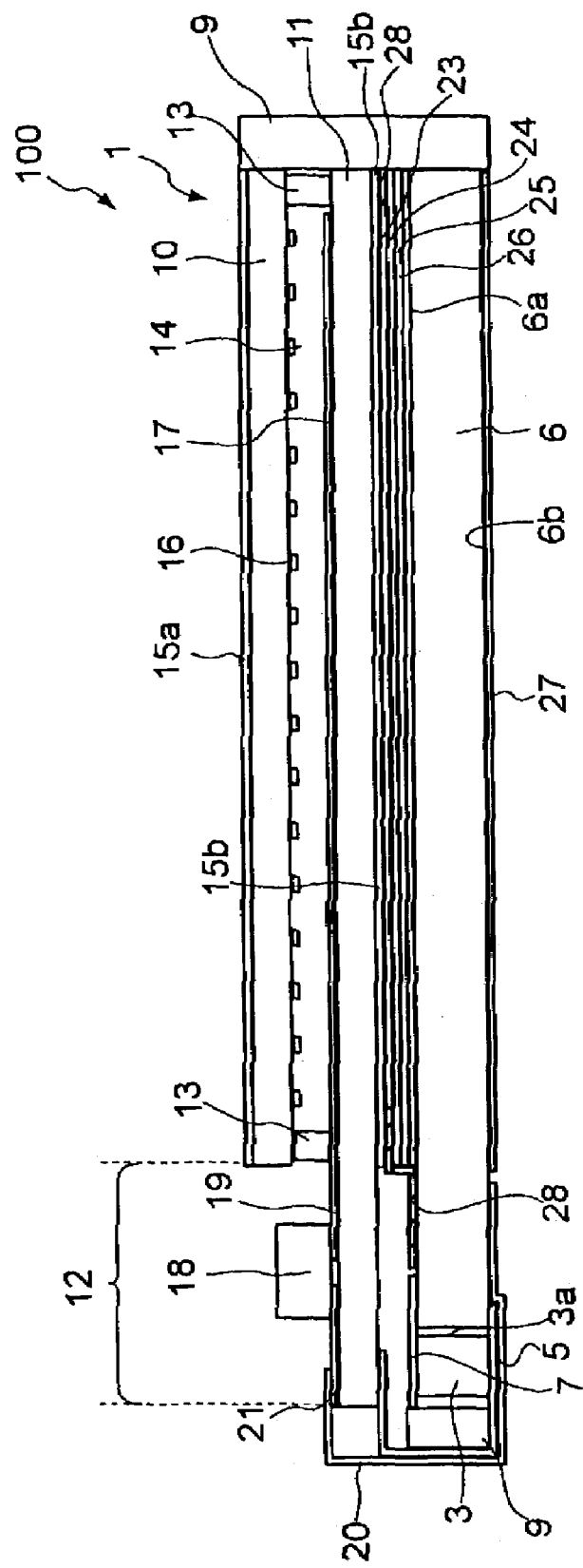
FIG. 21 is a schematic sectional view of the liquid crystal device according to a tenth embodiment of the present invention.

FIG. 21 is a schematic sectional view of the liquid crystal device according to a tenth embodiment of the present invention.

The configuration of this embodiment is different from the one in the second embodiment in the shape of the radiating plate 5.

As shown in FIG. 21, the liquid crystal device 100 includes a liquid crystal panel 1, an illuminating device 8, a frame-shaped adhesive sheet 28 for bonding the liquid crystal panel 1 and the illuminating device 8, and a case 9 for receiving these elements.

The liquid crystal panel 1 includes a first substrate 10, a second substrate 11 with a protruded region 12 extended from the first substrate 10, a seal material 13 disposed on the edge portion of the substrates for bonding the first substrate 10 and the second substrate 11, an STN liquid crystal 14 disposed in the space formed by the first substrate 10, the second substrate 11, and the seal material 13 as an electro-optical material, and a first polarizing plate 15a and a second polarizing plate 15b disposed for interposing a pair of the substrates therebetween.

On the surface of the first substrate 10 facing the second substrate 11, there are formed a first transparent electrode 16, which is shaped like a stripe, and includes a plurality of ITO (Indium Tin Oxide) films, and an alignment layer (not shown) made of polyimide, for example. to cover the first transparent electrode 16. On the other hand, on the surface of the second substrate 11 facing the first substrate 10, there are formed a second transparent electrode 17, which is shaped like a stripe and includes a plurality of ITO (Indium Tin Oxide) films to cross the first transparent electrode 16, and an alignment layer (not shown) made of polyimide, for example. to cover the second transparent electrode 17. In the liquid crystal device 100, a pixel is formed by the first transparent electrode 16 and the second transparent electrode 17 facing each other, and a liquid crystal 14 interposed therebetween. By selectively changing the voltage applied to each pixel, the optical characteristics of the liquid crystal 14 can be changed, and the light radiated from the illuminating device 8 can be modulated when being transmitted through the liquid crystal 14 corresponding to each pixel. By modulating the light as above, images or the like can be displayed, and driving regions, that is, a display unit in the liquid crystal panel 1 are almost equal to the region surrounded by the seal material 13.

The frame-shaped adhesive sheet 28 has light-shielding properties, and the opening of the adhesive sheet 28 includes driving regions. In addition, the reflectivity on the illuminating device 8 side of the adhesive sheet 28 is higher than that on the liquid crystal panel 1 side of the adhesive sheet 28. By the above configuration, the light is reflected from the light guide plate 6 side of the adhesive sheet 28 so as to decrease the loss of the light transmitted through the light guide plate 6, and the light from the liquid crystal panel 1 side is absorbed on the liquid crystal panel 1 side of the adhesive sheet 28. In addition, the adhesive sheet 28 is disposed such that the white LED 3 is not overlapped with the substrate 7 having the LED mounted thereon. According to the above configuration, since the substrate 7 and the adhesive sheet 28 do not overlap with the each other, it is possible to reduce the distance between the liquid crystal panel 1 and the light guide plate 6, and to make the thickness of the liquid crystal device 100 thin.

On the protruded portion 12, there are mounted a driving IC 18, and a circuit 19, formed by extending the second transparent electrode 17, for electrically connecting the driving IC 18 to the second transparent electrode 17, and a terminal unit 21 for electrically connecting a circuit board 20 by the driving IC 18 and an ACF (anisotropic conductive film).

The illuminating device 8 is disposed adjacent to the second transparent substrate 11 of the liquid crystal panel 1, and the second substrate 11 side of the liquid crystal panel 1 is the light-receiving side from the illuminating device 8, and the first substrate 10 side of the liquid crystal panel 1 is the light-emitting side of the light which is radiated from the illuminating device 8, passes through the inside of the liquid crystal panel 1, and is emitted from the liquid crystal panel 1.

Next, the configuration of the illuminating device is explained.

The illuminating device 8 includes a substantially rectangular-shaped light guide plate 6 toward a first side 6a of the light-emitting side of the second substrate 11 of the liquid crystal panel 1, a plurality of white LEDs 3 (three white LEDs 3 in this embodiment) as an optical source along the lateral side 6c of the light guide plate 6, a diffused plate 23, a prism sheet 24, a prism sheet 25, and a diffused plate 26 sequentially disposed as rectangular sheet-shaped optical parts between the liquid crystal panel 1 and the light guide plate 6 toward the liquid crystal panel 1 when assembling the liquid crystal device 100, and a rectangular sheet-shaped reflecting sheet 27 as an optical part disposed adjacent to a second side 6b facing the first side 6a as a light-emitting side of the light guide plate 6, and in addition, includes a substrate 7 having the white LED 3 mounted thereon, and a radiating plate 5 disposed as a radiating member facing the substrate 7 through the white LED 3. The radiating plate 5 is almost rectangular-shaped like in the second embodiment, and is configured such that the length of the side crossing the side along which the plurality of white LEDs 3 are disposed is longer than in the second embodiment. One end of the radiating plate 5 is disposed in contact with the white LED 3 and the light guide plate 6 like in the second embodiment, but the other end of the radiating plate 5 contacts the illuminating device 8 side of the second substrate 11.

The light guide plate 6 is intended to uniformly radiate the light from the white LED 3 onto the inner surface of the liquid crystal panel 1 for the liquid crystal panel 1 disposed corresponding to the light guide plate 6, and is made of acryl resin or polycarbonate, for example. The light emitted from the white LED 3 is radiated toward the lateral side 6c of the light guide plate 6 facing away from the first side 6a. The reflecting sheet 27 is intended to reflect the light from the light guide plate 6 on the liquid crystal panel 1 side. The diffused plates 23 and 26 are intended to make the brightness of the light inside a display screen more uniform. Two prism sheets 24, 25 are intended to adjust the alignment angle of the emitting light, and to improve the brightness of the front side.

Three white LEDs 3 are mounted on the substrate 7. The white LED 3 has a light emitting part 3a facing the light guide plate 6, and the light is emitted from the light emitting part 3a toward the light guide plate 6. The radiating plate 5 has a configuration in which a metal layer is formed over an adhesive layer as in the first embodiment. Therefore, the radiating plate 5 of the present invention is bonded and fixed to the white LED 3 by the adhesive layer. It is preferable that the metal layer as a part of the radiating plate 5 has a high thermal conductivity, and more particularly, it is preferable to use metal having a thermal conductivity equal to or greater than 90 W/mK at room temperature. In the embodiment of the present invention, either a copper film or an aluminum film, which has high thermal conductivities and relatively low cost, is used. Of course, the invention is not limited to one layer made of one material as the metal layer, a metal layer made of different materials can be employed. The thickness of the metal layer, is preferably, 10 μm to 1 mm. In the embodiment of the present invention, a copper film or an aluminum film having the thickness of 38 μm is used. In addition, the radiating plate 5 is flexible sheet-shaped.

As described above, by installing the white LED 3 so as to contact the radiating plate 5 having a high thermal conductivity, the heat generated from the white LED 3 can be transmitted to the radiating plate 5 to be radiated, and additionally, compared with the second embodiment, since the width of the radiating plate 5 is increased, the radiation effect can be improved. The heat generated from the white LED 3 when emitting light is radiated by the radiating plate 5 so as to decrease the temperature on the white LED 3, and more electric current can be flowed through the white LED 3 with decreased temperature, leading to an improvement in brightness of the white Led 3. In addition, for example, five white LEDs are conventionally used for the illuminating device, but in the embodiment of the present invention, just three white LEDs are enough for the illuminating device to provide the same value of the brightness by the same amount of the electric current as those in the conventional case so as to decrease the number of the employed components of the LEDs.

Eleventh Embodiment

A simple matrix liquid crystal device employing a COG type as one example of the electro-optical device according to the present invention will be explained referring to FIG. 22.

Figure 22:
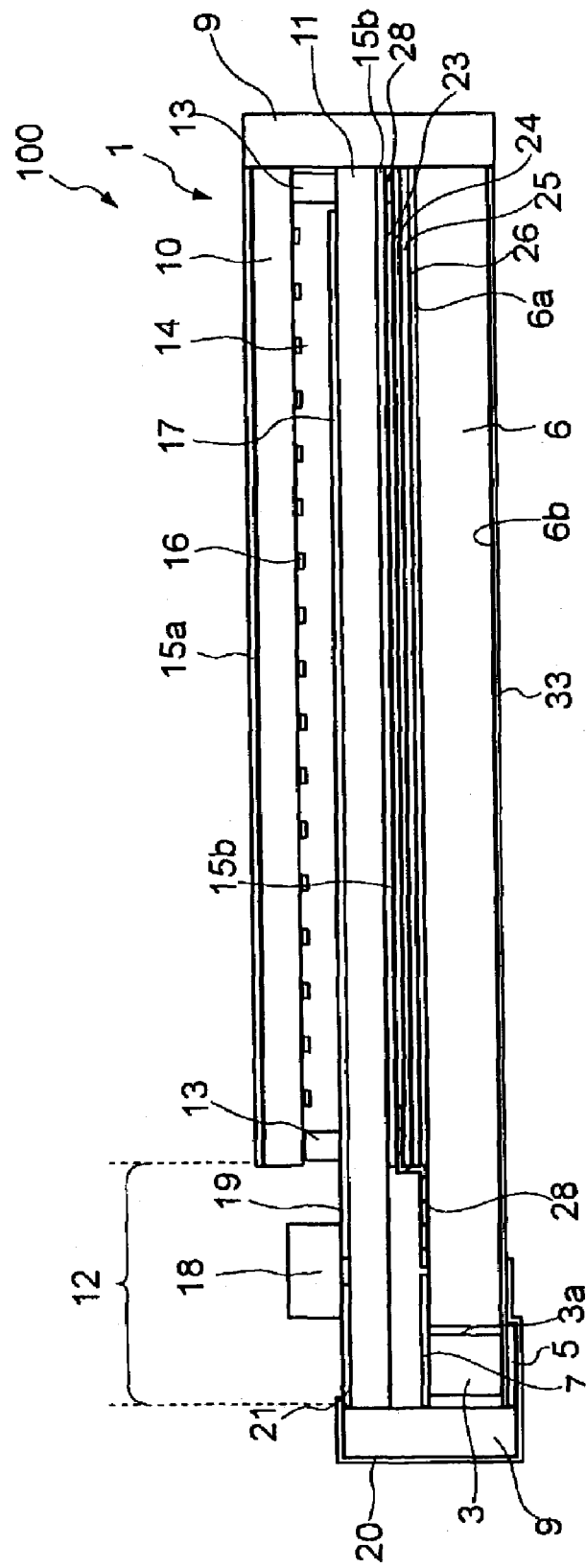
FIG. 22 is a schematic sectional view of the liquid crystal device according to an eleventh embodiment of the present invention.

FIG. 22 is a schematic sectional view of the liquid crystal device according to an eleventh embodiment of the present invention. The reflecting sheet 27 is disposed to correspond to the light guide plate 6 in the second embodiment, but in this embodiment, the reflecting sheet 27 is disposed to extend to the white LED 3 while corresponding to the light guide plate 6.

As shown in FIG. 11, the liquid crystal device 100 includes a liquid crystal panel 1, an illuminating device 8, a frame-shaped adhesive sheet 28 for bonding the liquid crystal panel 1 and the illuminating device 8, and a case 9 for receiving these elements.

The liquid crystal panel 1 includes a first substrate 10, a second substrate 11 with a protruded region 12 extended from the first substrate 10, a seal material 13 disposed on the edge portion of the substrates for bonding the first substrate 10 and the second substrate 11, an STN liquid crystal 14 disposed in the space formed by the first substrate 10, the second substrate 11, and the seal material 13 as an electro-optical material, and a first polarizing plate 15a and a second polarizing plate 15b disposed for interposing a pair of the substrates therebetween.

On the surface of the first substrate 10 facing the second substrate 11, there are formed a first transparent electrode 16, which is shaped like a stripe, and includes a plurality of ITO (Indium Tin Oxide) films, and an alignment layer (not shown) made of polyimide, for example. to cover the first transparent electrode 16. On the other hand, on the surface of the second substrate 11 facing the first substrate 10, there are formed a second transparent electrode 17, which is shaped like a stripe and includes a plurality of ITO (Indium Tin Oxide) films to cross the first transparent electrode 16, and an alignment layer (not shown) made of polyimide, for example. to cover the second transparent electrode 17. In the liquid crystal device 100, a pixel is formed by the first transparent electrode 16 and the second transparent electrode 17 facing each other, and a liquid crystal 14 interposed therebetween. By selectively changing the voltage applied to each pixel, the optical characteristics of the liquid crystal 14 can be changed, and the light radiated from the illuminating device 8 can be modulated when being transmitted through the liquid crystal 14 corresponding to each pixel. By modulating the light as above, images or the like can be displayed, and driving regions, that is, a display unit in the liquid crystal panel 1 are almost equal to the region surrounded by the seal material 13.

The frame-shaped adhesive sheet 28 has light-shielding properties, and the opening of the adhesive sheet 28 includes driving regions. In addition, the reflectivity on the illuminating device 8 side of the adhesive sheet 28 is higher than that on the liquid crystal panel 1 side of the adhesive sheet 28. By the above configuration, the light is reflected from the light guide plate 6 side of the adhesive sheet 28 so as to decrease the loss of the light transmitted through the light guide plate 6, and the light from the liquid crystal panel 1 side is absorbed on the liquid crystal panel 1 side of the adhesive sheet 28. In addition, the adhesive sheet 28 is installed so that it does not overlap with the substrate 7 on which the white LED 3 is mounted. Since the substrate 7 and the adhesive sheet 28 do not overlap with the each other, it is possible to reduce the distance between the liquid crystal panel 1 and the light guide plate 6, and make the thickness of the liquid crystal device 100 thin.

On the protruded portion 12, there are mounted a driving IC 18, and a circuit 19, formed by extending the second transparent electrode 17, for electrically connecting the driving IC 18 to the second transparent electrode 17, and a terminal unit 21 for electrically connecting a circuit board 20 by the driving IC 18 and an ACF (anisotropic conductive film).

The illuminating device 8 is disposed adjacent to the second transparent substrate 11 of the liquid crystal panel 1, and the second substrate 11 side of the liquid crystal panel 1 is the light-receiving side from the illuminating device 8, and the first substrate 10 side of the liquid crystal panel 1 is the light-emitting side of the light which is radiated from the illuminating device 8, passes through the inside of the liquid crystal panel 1, and is emitted from the liquid crystal panel 1.

Next, the configuration of the illuminating device is explained.

The illuminating device 8 includes a substantially rectangular-shaped light guide plate 6 with a first side 6a of the light-emitting side toward the second substrate 11 of the liquid crystal panel 1, a plurality of white LEDs 3 (three white LEDs 3 in this embodiment) as an optical source along the lateral side 6c of the light guide plate 6, a diffused plate 23, a prism sheet 24, a prism sheet 25, and a diffused plate 26 sequentially disposed as rectangular sheet-shaped optical parts between the liquid crystal panel 1 and the light guide plate 6 toward the liquid crystal panel 1 when assembling the liquid crystal device 100, and a rectangular sheet-shaped reflecting film 33 as an optical part adjacent to a second side 6b facing the first side 6a as a light-emitting side of the light guide plate 6, and in addition, includes a substrate 7 having the white LED 3 mounted thereon, and a radiating plate 5 disposed as a radiating member facing the substrate 7 through the white LED 3. In this embodiment, an ESR (Enhanced Specular Reflector) reflecting film 33, a product of Sumitomo 3M limited, is used as a reflecting sheet and the reflecting film 33 is disposed to correspond to the light guide plate 6 and the white LED 3. In addition, the radiating plate 5 is disposed to face the white LED through the ESR reflecting film 33. Since the ESR reflecting film 33 is thin and has a high reflectivity, the installation of the white LED 3 and the radiating plate 5 through the ESR reflecting film 33 brings both effects of preventing the brightness decrease and transmitting the high heat generated.

The light guide plate 6 is intended to uniformly radiate the light from the white LED 3 onto the inner surface of the liquid crystal panel 1 for the liquid crystal panel 1 disposed corresponding to the light guide plate 6, and is made of acryl resin or polycarbonate, for example. The light emitted from the white LED 3 is radiated toward the lateral side 6c of the light guide plate 6 facing away from the first side 6a. The reflecting sheet 27 is intended to reflect the light from the light guide plate 6 on the liquid crystal panel 1 side. The diffused plates 23 and 26 are intended to make the brightness of the light inside a display screen more uniform. Two prism sheets 24, 25 are intended to adjust the alignment angle of the emitting light, and to improve the brightness of the front side.

Three white LEDs 3 are mounted on the substrate 7. The white LED 3 has a light emitting part 3a facing the light guide plate 6, and the light is emitted from the light emitting part 3a toward the light guide plate 6. The radiating plate 5 has a configuration in which a metal layer is formed over an adhesive layer as in the first embodiment. Therefore, the radiating plate 5 of the present invention is bonded and fixed to the white LED 3 by the adhesive layer. It is preferable that the metal layer as a part of the radiating plate 5 has a high thermal conductivity, and more particularly, it is preferable to use metal having a thermal conductivity equal to or greater than 90 W/mK at room temperature. In the embodiment of the present invention, either a copper film or an aluminum film, which has high thermal conductivities and relatively low cost, is used. Of course, the invention is not limited to one layer made of one material as the metal layer, a metal layer made of different materials can be employed. The thickness of the metal layer, is preferably, 10 μm to 1 mm. In the embodiment of the present invention, a copper film or an aluminum film having the thickness of 38 µm is used. In addition, the radiating plate 5 is flexible sheet-shaped.

In this embodiment, it is possible to achieve both effects of preventing the brightness decrease and transmitting the heat by employing the ESR (Enhanced Specular Reflector) reflecting film 33 from Sumitomo 3M limited, being thin in thickness, as a reflecting sheet.

Example of Application

Embodiments of Electronic Device

Figure 23:
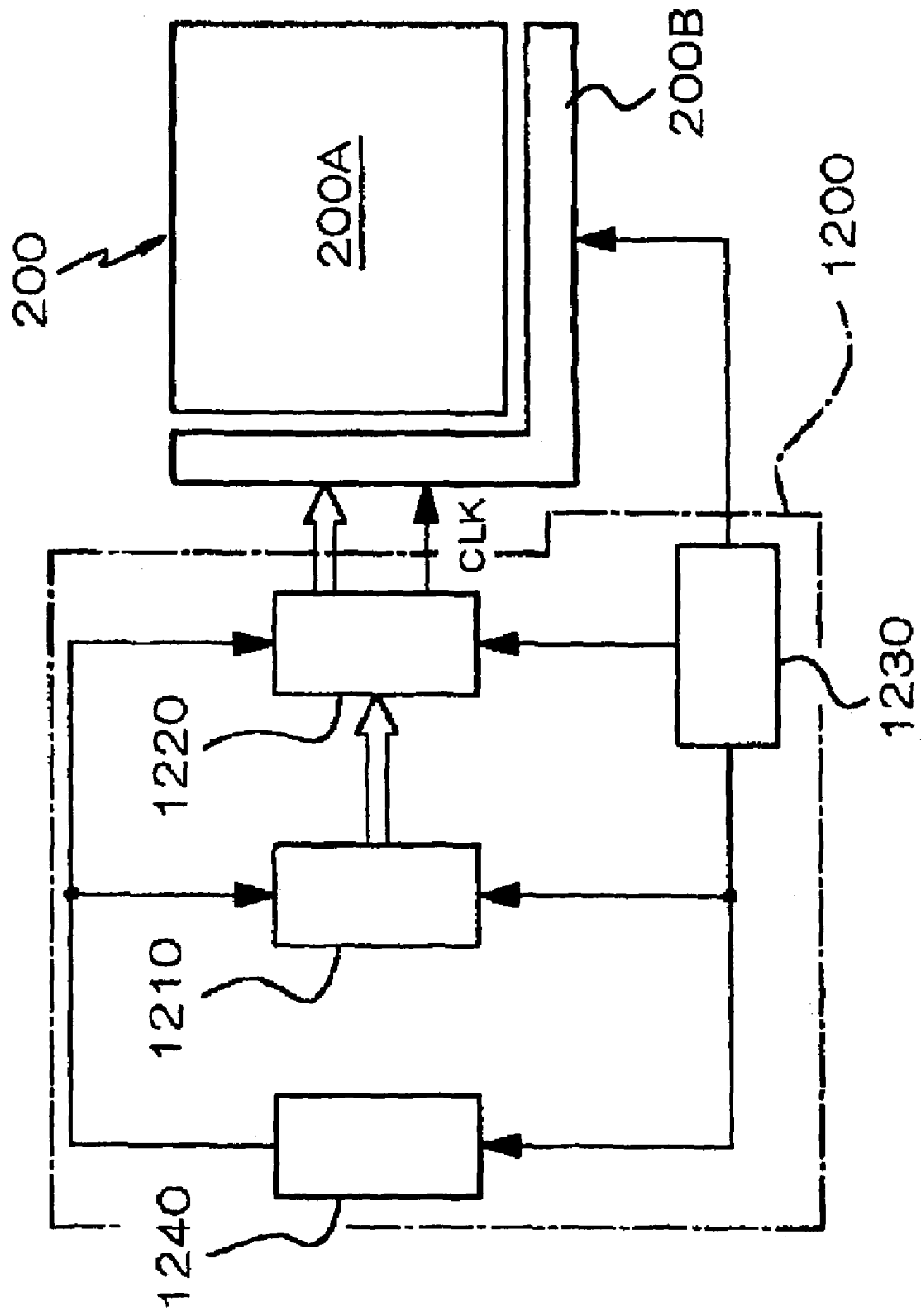
FIG. 23 is a block diagram schematically illustrating the configuration of the electronic device.

Finally, there will be described on the embodiments in which a liquid crystal device including the LCD 1 as above is used as a display in an electronic device. FIG. 23 is a schematic representation showing the overall configuration of the embodiments of the present invention. The electronic device described here includes an LCD 200 the same as the above, and control means 1200 for controlling the LCD. Here, the LCD 200 is represented by conceptually divided into a panel structure 200A and a driving circuit 200B including a semiconductor IC, for example. In addition, the control means 1200 includes a display information output source 1210, a display processing circuit 1220, a power circuit 1230, and a timing generator 1240.

The display information output source 1210 includes a memory having ROM (Read Only Memory) or RAM (Random Access Memory), for example., a storage unit having an electromagnetic record disk or an optical record disk, for example., and a tuning circuit for tuning-outputting digital image signals, and is intended to supply display information to the display information processing circuit 1220 as a form of image signals, for example. of a predetermined format based on various kinds of clock signals produced by the timing generator 1240.

The display information processing circuit 1220 includes various kinds of widely-known circuits such as a serial-parallel conversion circuit, an amplification inversion circuit, a rotation circuit, a gamma correct circuit, a clamp circuit, for example., and performs the processing of the input display information, and supplies the image information to the driving circuit 200B with a clock signal (CLK). The driving circuit 200B includes a scanning driving circuit, a data line driving circuit, and a test circuit. The power circuit 1230 supplies a power to each element described above.

Figure 24:
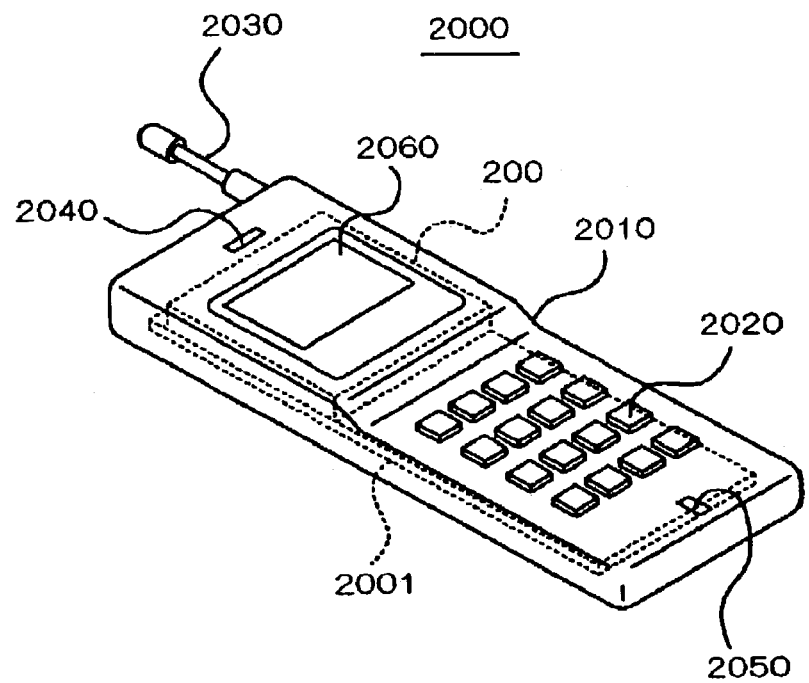
FIG. 24 is a perspective view illustrating the external feature of a portable phone according to one embodiment of the electronic devices of the present invention.

FIG. 24 illustrates a portable phone as one example of the electronic devices according to one embodiment of the present invention. The portable phone 2000 is configured such that a circuit board 2001 is installed inside a case 2010, and the above LCD 200 is mounted inside the circuit board 2001. On the front of the circuit board 2001, there is aligned a control button 2020, and at one end thereof, there is installed an antenna 2030 movably in and out. Inside a receiver 2040, there is disposed a speaker, and inside a phone transmitter 2050, there is provided a microphone.

The LCD 200 installed inside the case 2010 is configured to such that the display surface is visible through a display window 2060. In addition, the electro-optical device and the electronic device are not limited to the examples described above, and it is apparent that various modifications will be possible within the spirit and scope of the present invention. For example, the electro-optical device in the above embodiment can be employed on an active matrix typed liquid crystal instrument using an active device such as a simple matrix type or TFT (Thin Film Transistor) or TFD (Thin Film Diode), for example. In addition, in the embodiment, a detailed description on an external connection circuit parts for supplying the LCD connected to the LCD with a driving signal is omitted, but it is possible to employ a COG typed-structure having a driving semiconductor device directly mounted on the LCD, or a structure with a flexible circuit board or a TAB board on the LCD.

Mobile Typed-Personal Computer

Figure 25:
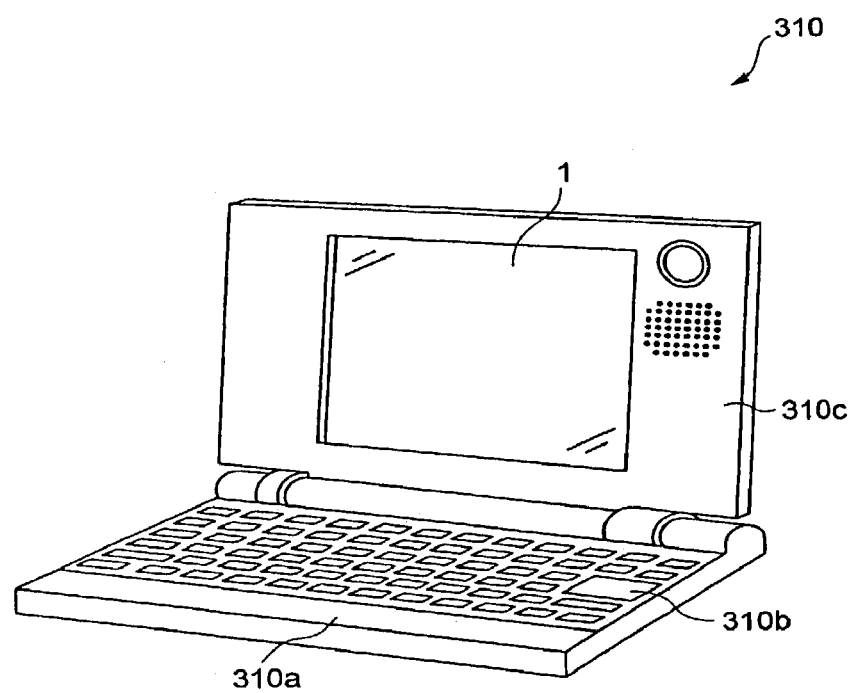
FIG. 25 is a perspective view illustrating a mobile computer according to one embodiment of the electronic devices of the present invention.

FIG. 25 illustrates a mobile typed-personal computer 310 as one example of the electronic devices according to one embodiment of the present invention. The personal computer 310 here includes a body unit 310a with a keyboard 310b, and a liquid crystal unit 310c. The liquid crystal unit 310c has a liquid crystal device on the external frame, and the liquid crystal device, for example, can be structured by using the liquid crystal device 100 described in the aforementioned embodiment.

Digital Watch

Figure 26:
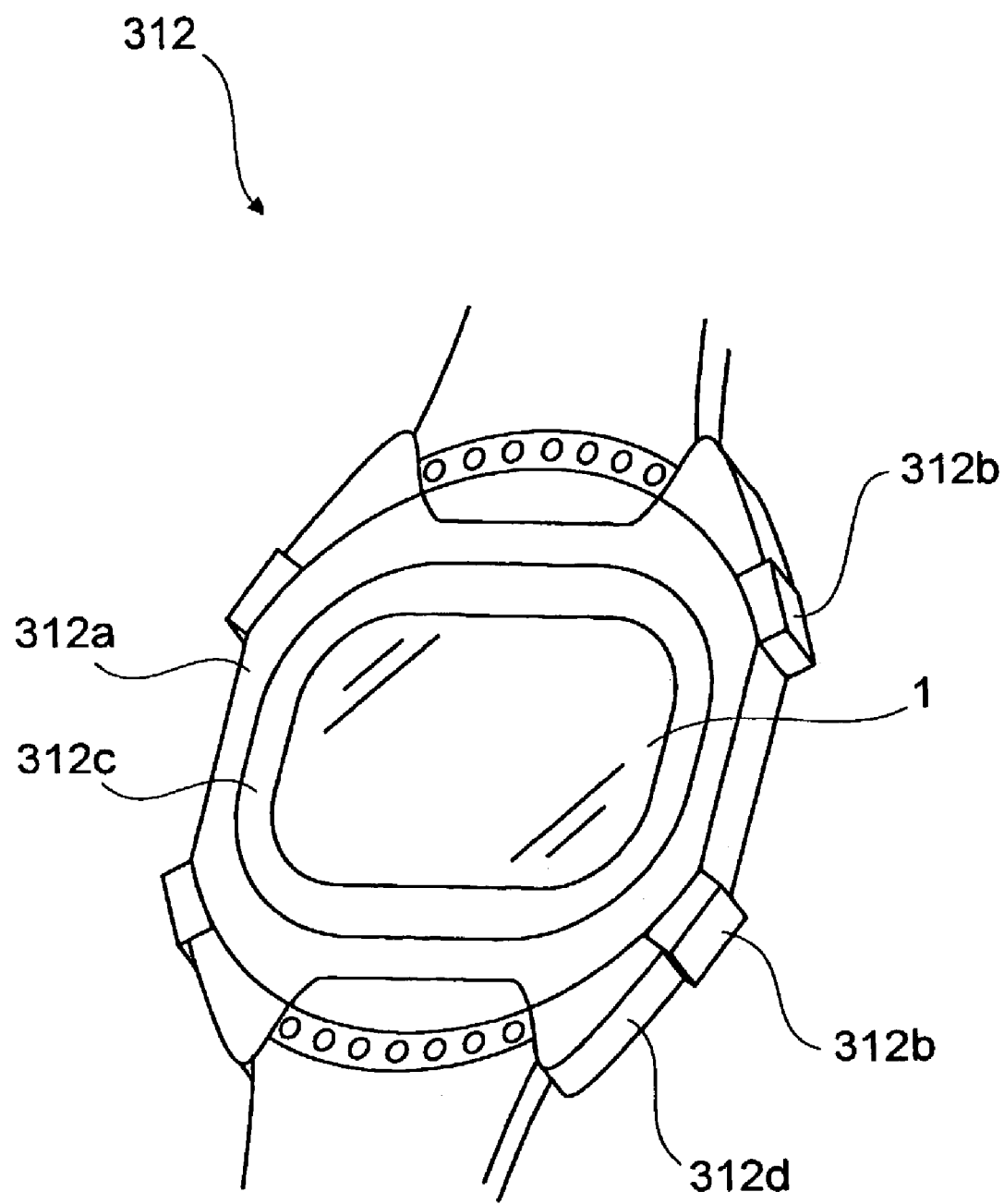
FIG. 26 is a perspective view illustrating a digital watch according to another embodiment of the electronic devices of the present invention.

FIG. 26 illustrates a digital watch as one example of the electronic devices according to another embodiment of the present invention. The digital watch 312 here includes a body unit 312a, a plurality of control buttons 312b, and a display unit 312c. The control button 312b is installed on the external frame 312d of the body unit 312a, and the display unit 312c is disposed inside the external frame 312d of the body unit. The display unit 312c, for example, can be structured by using the liquid crystal device 100 described in the aforementioned embodiment.

Digital Still Camera

Figure 27:
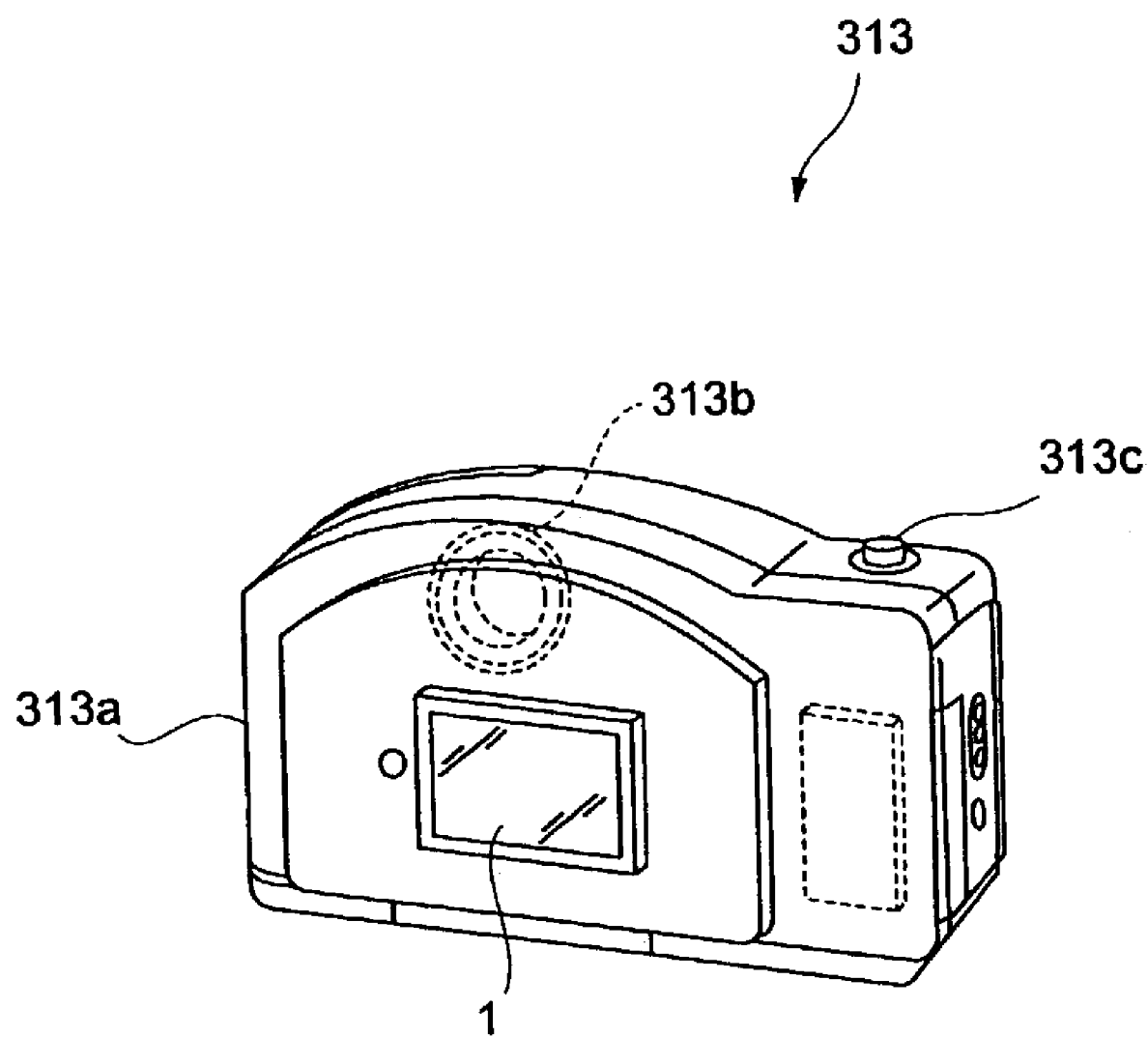
FIG. 27 is a perspective view illustrating a digital still camera according to another embodiment of the electronic devices of the present invention.

FIG. 27 illustrates a digital still camera 313 as one example of the electronic devices according to a further embodiment of the present invention. While a normal camera uses a film for the photoimage of a subject, the digital still camera photoelectricly-converts the photoimage of a subject by an imaging device such as CCD (Charge Coupled Device), for example. and to produce imaging signals.

Here, on the bottom of the case of the digital still camera 313, there is installed a liquid crystal device, and it is structured to display based on the imaging signal by the CCD. Because of that, the liquid crystal device functions to display a subject in a viewfinder. In addition, on the front side 313a of the case (the back side of the structure in FIG. 27), there is a light receiving unit 313b including an optical lens or the CCD, for example. The liquid crystal device can be structured by using, for example, the liquid crystal device 100 described in the aforementioned embodiment. A photographer confirms the subject displayed on the liquid crystal device, and pushes the shutter button 313c for photographing.

Touch Panel

Figure 28:
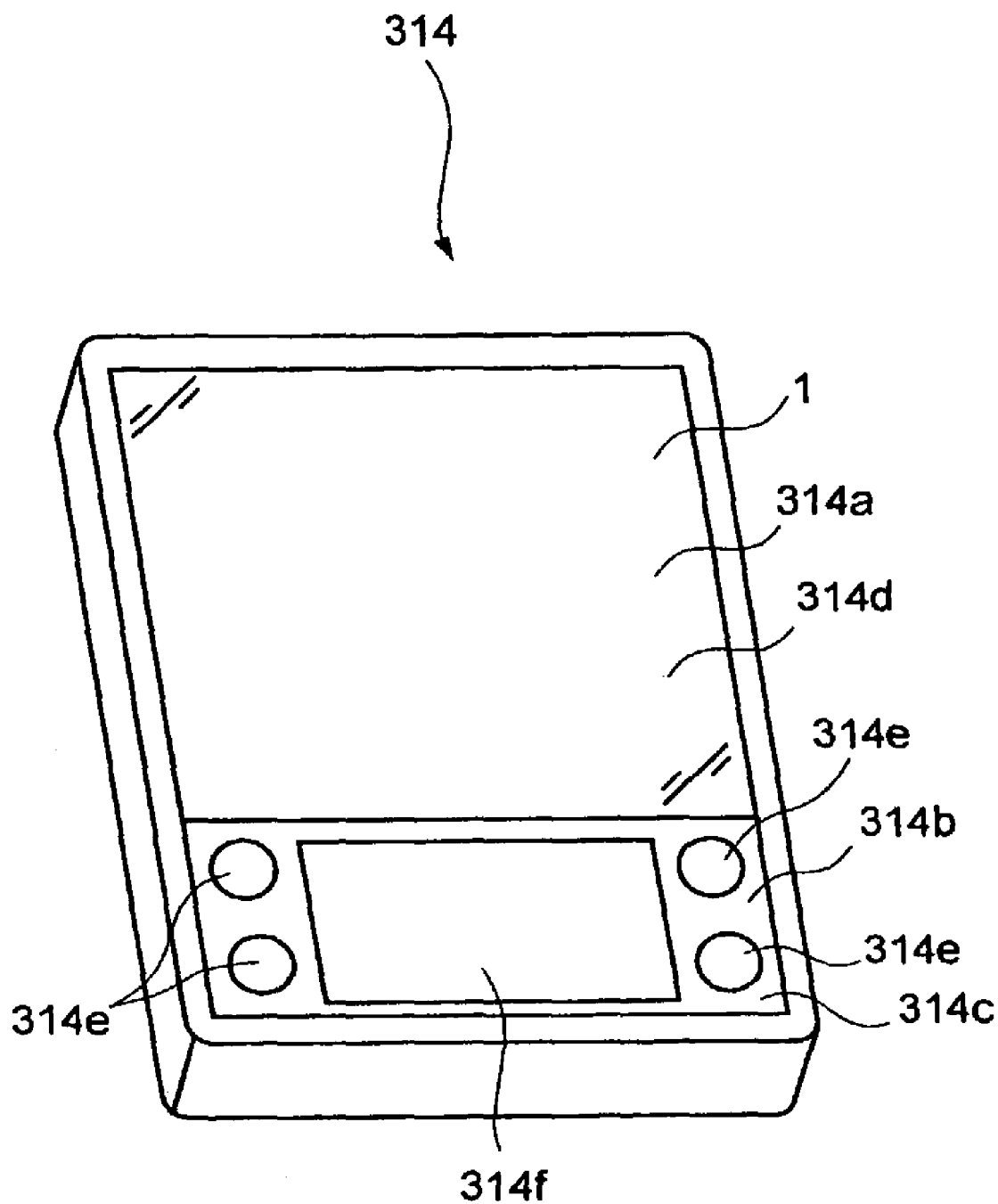
FIG. 28 is a perspective view illustrating an instrument employing a touch panel according to another embodiment of the electronic devices of the present invention.

FIG. 28 illustrates an instrument 314 including a touch panel having a liquid crystal device mounted thereon. The instrument 314 including the touch panel has the liquid crystal device 100 installed therein, and includes a liquid crystal display region 314a displaying images by a liquid crystal panel 1 as a part of the liquid crystal device 100, and a first input region 314c located below the liquid crystal display region 314a and having an input sheet 314b disposed thereon. The liquid crystal device 100 has a configuration in which a rectangular shaped-liquid crystal panel 1 and the touch panel as a rectangular shaped-input panel are overlapped with each other two-dimensionally. The touch panel is larger than the liquid crystal panel 1, and the touch panel is configured to protrude from one end of the liquid crystal panel 1.

The touch panel is disposed on the liquid crystal display region 314a and the first input region 314c, and the region corresponding to the liquid crystal display region 314a can function as a second input region 314d which is possibly input-controllable like the first input region 314c. The touch panel includes a second side located on the liquid crystal panel 1 side, and a first side corresponding thereto, and an input sheet 314b is bonded to the location corresponding to the first input region 314c of the first side. On the input sheet 314b, there are printed an icon 314e and a frame for identifying a handwriting character identifying region 314f. In the first input region 314c, the data input, for example. can be performed by the weighing with input means such as fingers or pen, for example. on the first side of the touch panel through the input sheet 314b for the selection of the icon 314e or the character input of the handwriting characters into the character identifying region 314f. On the other hand, in the second input region 314d, the data input can be performed by displaying, for example, a mode on the liquid crystal panel 1 to be described below and weighing a finger or a pen on the first side of the touch panel for the selection of the displayed mode as well as actually seeing the image on the liquid crystal panel 1.

Calculator

Figure 29:
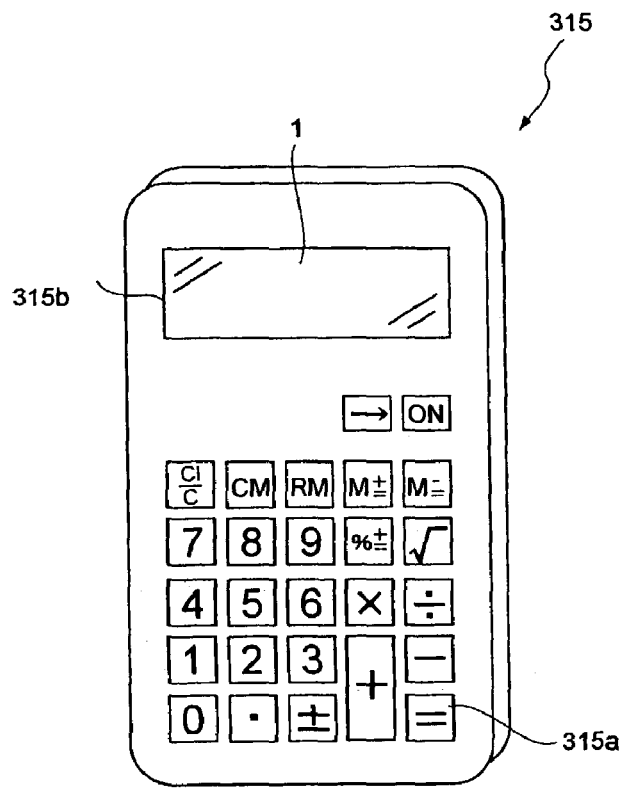
FIG. 29 is a perspective view illustrating an instrument employing a calculator according to another embodiment of the electronic devices of the present invention.

FIG. 29 illustrates a calculator as another example of the electronic devices according to one embodiment of the present invention. The calculator 315, here, includes an external frame having a plurality of control buttons 315a and the liquid crystal device as a display unit 315b. The liquid crystal device can be structured by using the liquid crystal device 100 described, for example, in the above embodiment.

Liquid Crystal Television

Figure 30:
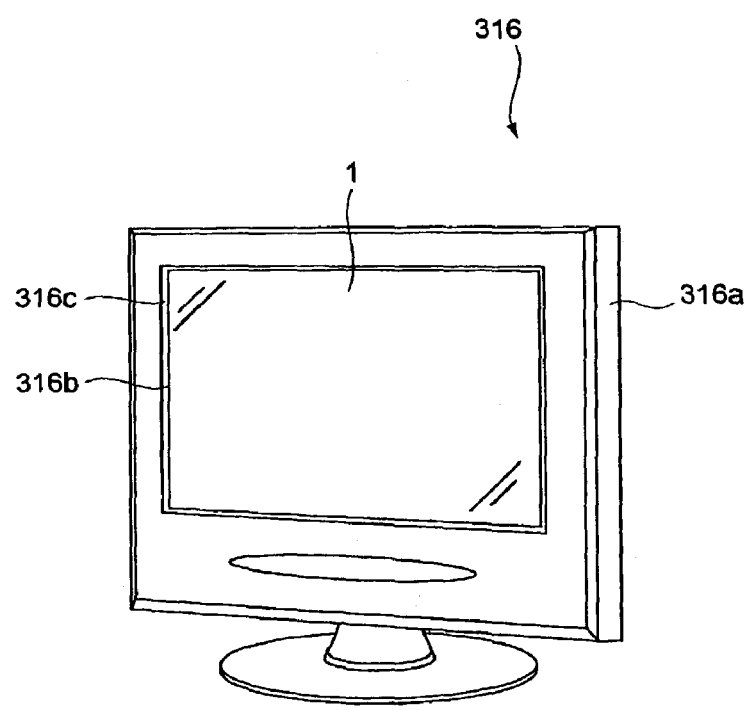
FIG. 30 is a perspective view illustrating an instrument employing a liquid crystal television according to another embodiment of the electronic devices of the present invention.

FIG. 30 illustrates a liquid crystal television as one example of the electronic devices according to one embodiment of the present invention. The liquid crystal television 316, here, includes a body unit 316a and a display unit 316b. The display unit 316b is structured to install a liquid crystal device on an external frame 316c. The liquid crystal device 100 can be structured by using the liquid crystal device described, for example, in the above embodiment.

Projector

Figure 31:
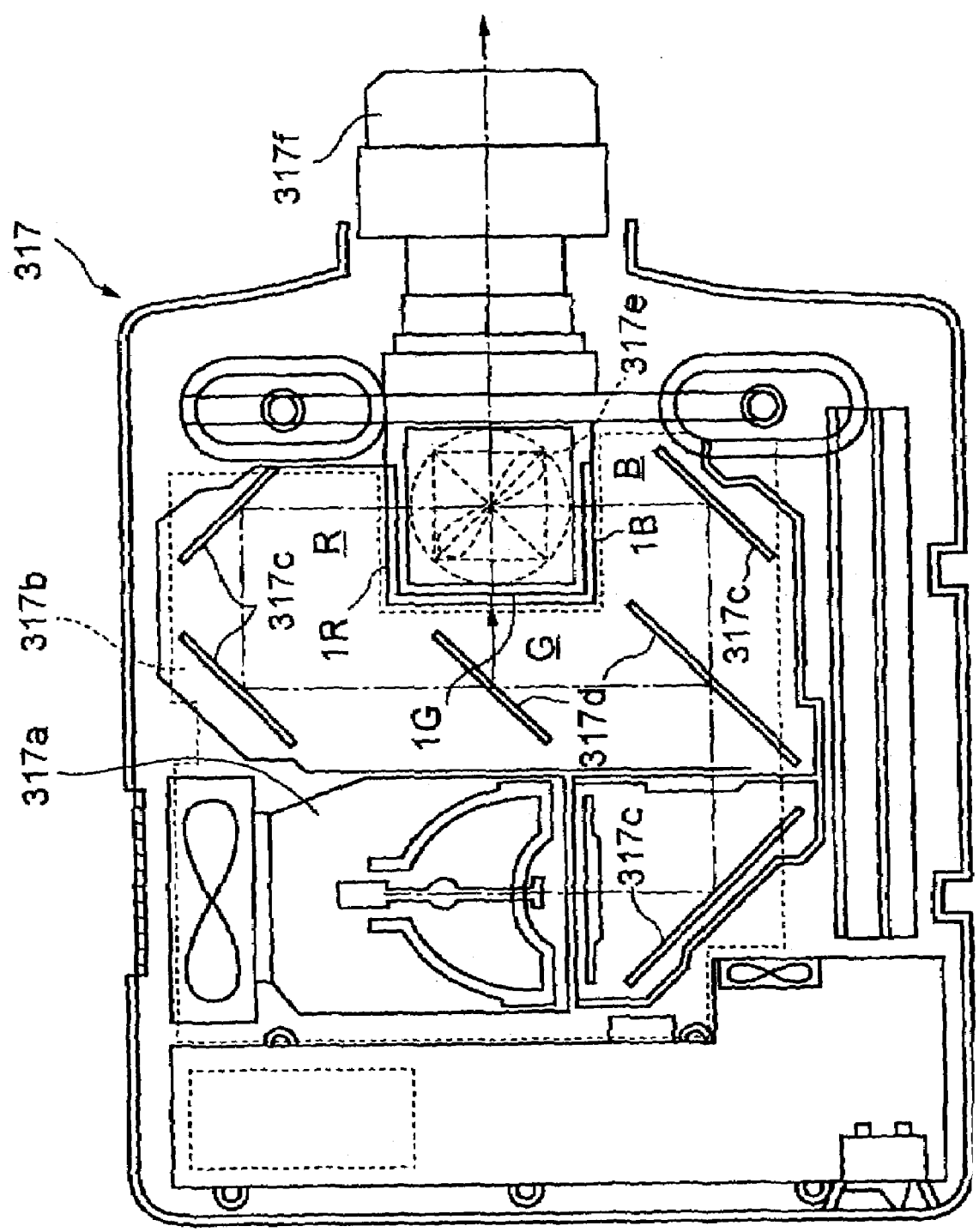
FIG. 31 is a sectional view illustrating an instrument employing a projector according to another embodiment of the electronic devices of the present invention.

FIG. 31 is a plan view of the configuration example of a projector. As shown in the drawing, inside the projector 317, there is provided a lamp unit 317a including a white optical source such as a halogen lamp, for example. The transmitting light emitted from the lamp unit 317a, is divided into the RGB three primary lights by four mirrors 317c and two dichroic mirrors 317d disposed inside the light guide 317b, and goes into a liquid crystal device (1R, 1B and 1G) as a light bulb corresponding to each primary color.

The liquid crystal device (1R, 1B and 1G) is the liquid crystal device 100 aforementioned, and is driven by a primary color signal of R, G, B supplied through a driving IC respectively. The light converted by the liquid crystal device enters a dichroic prism 317e from three directions. In the dichroic prism 317e, the light of G goes straight while the light of R and B is refracted into 90 degrees. Therefore, as a result of mixing the images from each color, color images are displayed on a screen, for example. through incident lens 317f.

Besides the above example, as examples of the electronic devices related to the present invention, there are a view finder type or a monitor direct vision type video tape recorder, a car navigation instrument, a pager, an electronic book, a word processor, a work station, a television telephone, a POS terminal, or the like. Also, the liquid crystal device of the present invention can be employed on the display unit of such various electronic devices as above.

In addition, in the embodiments described above, a liquid crystal device is explained as one example of electronic optical instruments, but besides the liquid crystal device, the electronic optical instruments of the present invention also includes an organic electro-luminescence instrument, an inorganic electro-luminescence instrument, a plasma display instrument, an electrophoresis display instrument, a field emission display instrument, an LED (Light-emitting diode) display instrument, or the like.

The entire disclosure of Japanese Patent Application Nos. 2002-102951 filed Apr. 4, 2002 and 2002-200412 filed Jul. 9, 2002 are incorporated by reference.

What is claimed is:

1. An electro-optical display device comprising:
an electro-optical panel;
a point light source;
a light guide plate with a narrow end disposed adjacent to the point light source and a broader surface facing the electro-optical panel, the light guide plate receiving light radiated from the point light source at the narrow end and guiding the received light toward the electro-optical panel from the broader surface;
a metal plate radiator having a substantial sheet shape, the metal plate radiator having a first broad surface, a second broad surface facing in the opposite direction than the first broad surface, and at least one side surface extending between the first and second broad surfaces, the first and second broad surfaces each being larger than the side surface, the second broad surface being at least partially exposed; and
an adhesive layer that attaches the first broad surface of the metal plate radiator directly to the light point light source;
wherein the first broad surface of the metal plate radiator is in contact with the light guide plate adjacent to the point light source.

2. The electro-optical display device according to claim 1, wherein the metal plate radiator includes a metal having a thermal conductivity equal to or greater than 90 W/mK at room temperature.

3. The electro-optical display device according to claim 1, further comprising a substrate, the point light source being mounted on the substrate.

4. The electro-optical display device according to claim 1, wherein the metal plate radiator overlaps, at least partially in plan, a surface on the opposite side of the light guide plate than the broader surface of the light guide plate through which light is emitted.

5. The electro-optical display device according to claim 1, wherein the electro-optical panel includes a driving region that drives by supplying an electric potential, a light shielding sheet being disposed between the electro-optical panel and the light guide plate, the light shielding sheet having a frame shape and an opening that includes the driving region, the light shielding sheet having a side facing the light guide plate and a side facing the electro-optical panel, the side facing the light guide plate having a higher reflectivity than the side facing the electro-optical panel.

6. The electro-optical display device according to claim 1, wherein a portion of the first broad surface of the metal plate radiator is exposed.

7. The electro-optical display device according to claim 6, wherein the point light source is disposed on and attached to the first broad surface of the metal plate radiator between the light guide plate and the exposed portion of the first broad surface of the metal plate radiator.

8. An electro-optical display device comprising:
an electro-optical panel;
a point light source;
a light guide plate with a narrow end disposed adjacent to the point light source and a broader surface facing the electro-optical panel, the light guide plate receiving light radiated from the point light source at the narrow end and guiding the received light toward the electro-optical panel from the broader surface; and
a metal plate radiator having a substantial sheet shape, the metal plate radiator having a first broad surface, a second broad surface facing the opposite direction than the first broad surface, and at least one side surface extending between the first and second broad surfaces, the first and second broad surfaces each being larger than the side surface, the first broad surface of the metal plate radiator being directly attached to the point light source, the second broad surface being at least partially exposed;
wherein the first broad surface of the metal plate radiator is in contact with the light guide plate adjacent to the point light source.

9. The electro-optical display device according to claim 8, wherein the point light source is mounted on the metal plate radiator.

10. The electro-optical display device according to claim 9, the electro-optical panel including a driving region that drives by supplying an electric potential, a light shielding sheet being disposed between the electro-optical panel and the light guide plate, the metal plate radiator being disposed at another region than the driving region.

11. The electro-optical display device according to claim 8, wherein a portion of the first broad surface of the metal plate radiator is exposed.

12. The electro-optical display device according to claim 11, wherein the point light source is disposed on and attached to the first broad surface of the metal plate radiator between the light guide plate and the exposed portion of the first broad surface of the metal plate radiator.

* * * * *